United States Patent [19]

Hurter

[11] Patent Number: 4,906,740
[45] Date of Patent: Mar. 6, 1990

[54] MONOAZO DYES CONTAINING AS THE AZO COMPONENT A PHENYLSULFONYLPHENYL RADICAL

[75] Inventor: Rudolf Hurter, Basel, Switzerland

[73] Assignee: Ciba-Geigy Corporation, Ardsley, N.Y.

[21] Appl. No.: 886,756

[22] Filed: Jul. 15, 1986

Related U.S. Application Data

[63] Continuation of Ser. No. 803,355, Dec. 2, 1985, which is a continuation-in-part of Ser. No. 515,412, Jul. 20, 1983, abandoned.

[30] Foreign Application Priority Data

Jul. 29, 1982 [CH] Switzerland .................. 4596/82

[51] Int. Cl.$^4$ .................. C09B 29/036; C09B 29/08; C09B 43/02; D06P 1/18
[52] U.S. Cl. .................. 534/782; 534/643; 534/739; 534/740; 534/750; 534/771; 534/783; 534/790; 534/794; 534/826; 534/845; 534/876; 534/882
[58] Field of Search .............. 534/739, 750, 782, 771, 534/783, 790, 643, 794, 826, 845, 876, 882

[56] References Cited

U.S. PATENT DOCUMENTS

| | | | |
|---|---|---|---|
| 3,417,076 | 12/1968 | Sartori | 534/783 X |
| 3,692,769 | 9/1972 | Weaver et al. | 534/783 X |
| 4,042,580 | 8/1977 | Groebke | 534/783 X |
| 4,046,757 | 9/1977 | Meybeck et al. | 534/783 X |
| 4,119,624 | 10/1978 | Boyd et al. | 534/783 X |
| 4,267,104 | 5/1981 | Giles et al. | 534/783 X |
| 4,582,897 | 4/1986 | Mausezahl et al. | 534/783 |
| 4,602,084 | 7/1986 | Hurter | 534/783 X |

FOREIGN PATENT DOCUMENTS

| | | | |
|---|---|---|---|
| 0042357 | 6/1981 | European Pat. Off. | 534/783 |
| 101664 | 7/1983 | European Pat. Off. | |
| 2021619 | 12/1979 | United Kingdom | 534/783 |

*Primary Examiner*—Floyd D. Higel
*Attorney, Agent, or Firm*—Edward McC. Roberts; Meredith C. Findlay

[57] ABSTRACT

The present invention relates to monoazo dyes which dye polyamide material with good light- and wet-fastness and which have the formula

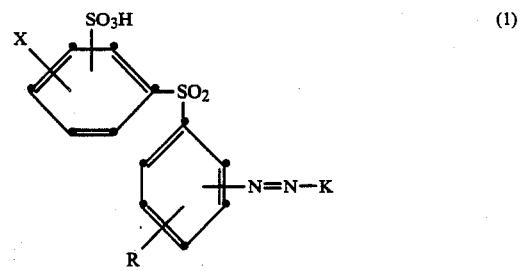

in which K is the radical of an amino- or alkoxy-benzene, amino- or alkoxy-naphthalene, naphthol, aminonaphthol, pyrazolone, aminopyrazole, indole, naphthimidazole, diphenylamine, tetrahydroquinoline or acetoacetamide and can be further substituted, R is hydrogen, halogen, $C_{1-6}$-alkyl, trifluoromethyl, carboxyl or a $-SO_2-C_{1-6}$-alkyl, $-SO_2-R_1$,

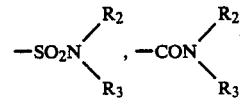

$-CO-R_4$ group, in which $R_1$ is a substituted or unsubstituted phenyl- or naphthyl-$C_{1-4}$-alkyl radical, $R_2$ and $R_3$ independently of one another are hydrogen or a substituted or unsubstituted $C_{1-6}$-alkyl or $C_{5-7}$-cycloalkyl radical and $R_4$ is a substituted or unsubstituted phenyl radical, and X is hydrogen, $C_{1-4}$-alkyl, $C_{1-4}$-alkoxy or halogen, and in which R in formula (1) may not be hydrogen or chlorine if the radical $-N=N-K$ is bonded to the phenyl ring in the o-position relative to the $-SO_2-$ group and K is the radical of an aminonaphthalenesulfonamide or a 2-amino-8-hydroxynaphthalene-6-sulfonic acid.

17 Claims, No Drawings

MONOAZO DYES CONTAINING AS THE AZO COMPONENT A PHENYLSULFONYLPHENYL RADICAL

This application is a continuation of application Ser. No. 803,355, filed 12/2/85, which is a continuation-in-part of application Ser. No. 515,412, filed July 20, 1983, now abandoned.

The present invention was based on the object of discovering novel monoazo dyes which are suitable for dyeing natural and synthetic polyamides from an aqueous bath, which furthermore have shades in the range from yellow to red and which also have improved fastness properties, especially light-fastness properties.

We have now found that the monoazo dyes of the formula (1) fulfil the above requirements.

The present invention thus relates to monoazo dyes of the formula

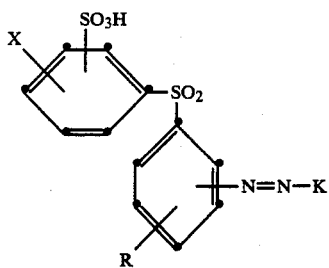

in which K is the radical of an amino- or alkoxy-benzene, amino- or alkoxy-naphthalene, naphthol, aminonaphthol, pyrazolone, aminopyrazole, indole, naphthimidazole, diphenylamine, tetrahydroquinoline or acetoacetamide and can be further substituted, R is hydrogen, halogen, $C_{1-6}$-alkyl, trifluoromethyl, carboxyl or a $—SO_2—C_{1-6}$-alkyl, $—SO_2—R_1$,

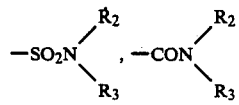

or $—CO—R_4$ group, in which $R_1$ is a substituted or unsubstituted phenyl- or naphthyl-$C_{1-4}$-alkyl radical, $R_2$ and $R_3$ independently of one another are hydrogen or a substituted or unsubstituted $C_{1-6}$-alkyl or $C_{5-7}$-cycloalkyl radical and $R_4$ is a substituted or unsubstituted phenyl radical, and X is hydrogen, $C_{1-4}$-alkyl, $C_{1-4}$-alkoxy or halogen, and in which R in formula (1) may not be hydrogen or chlorine if the radical $—N=N—K$ is bonded to the phenyl ring in the o-position relative to the $—SO_2—$ group and K is the radical of an aminonaphthalenesulfonamide or a 2-amino-8-hydroxynaphthalene-6-sulfonic acid.

The radical K of a coupling component can contain the conventional substituents of azo dyes, for example alkyl groups having 1 to 4 carbon atoms, such as methyl, ethyl, propyl, isopropyl, butyl, isobutyl, sec.-butyl and tert.-butyl, alkoxy groups having 1 to 4 carbon atoms, such as methoxy, ethoxy, propoxy, isopropoxy, butoxy, isobutoxy, sec.-butoxy and tert.-butoxy, phenoxy, alkanoylamino groups having 1 to 6 carbon atoms, such as acetylamino or propionylamino, benzoylamino, amino groups, such as $—NH_2$, methylamino, ethylamino, dimethylamino, diethylamino, cyanoethylamino, hydroxyethylamino, dihydroxyethylamino, cyclohexylamino, benzylamino and phenylamino, carboxylic acid ester groups, such as methoxycarbonyl and ethoxycarbonyl, trifluoromethyl, nitro, cyano, acetyl, methylsulfonyl, carbamoyl, sulfamoyl, ureido, hydroxyl, carboxyl, sulfo, sulfomethyl and halogen, such as fluorine, chlorine and bromine, as well as fibre-reactive radicals.

Examples of halogen radicals R and X are, independently of one another, fluorine, chlorine and bromine atoms.

A $C_{1-6}$-alkyl radical R is, for example a methyl, ethyl, propyl, isopropyl, butyl, isobutyl, sec.-butyl, tert.-butyl, pentyl or hexyl radical. R is preferably a methyl radical.

An $—SO_2—C_{1-6}$—alkyl radical R is, for example, a methyl-, ethyl-, propyl-, isopropyl-, butyl-, isobutyl-, sec.-butyl-, tert.-butyl-, pentyl- or hexyl-sulfonyl radical. R is preferably the methyl- or ethyl-sulfonyl radical.

A phenyl- or naphthyl-$C_{1-4}$-alkyl radical $R_1$ is, for example, the benzyl, phenethyl or naphthylmethyl radical, which can be further substituted in the aryl moiety, for example by $C_{1-4}$-alkyl groups, such as methyl, $C_{1-4}$-alkoxy groups, such as methoxy and ethoxy, halogen, such as fluorine, chlorine or bromine, alkanoylamino groups having 1 to 6 carbon atoms, such as acetylamino, hydroxyl and carboxyl.

Examples of $C_{1-6}$-alkyl radicals $R_2$ and $R_3$ are, independently of one another, the methyl, ethyl, propyl, isopropyl, butyl, sec.-butyl, tert.-butyl, pentyl and hexyl radicals, which can be further substituted, for example by halogen, such as fluorine, chlorine and bromine, hydroxyl, cyano and alkoxy, such as methoxy, ethoxy, propoxy, isopropoxy and butoxy. Examples are β-hydroxyethyl, β-methoxyethyl, β-cyanoethyl and β-chloroethyl.

Cycloalkyl radicals $R_2$ and $R_3$ are, independently of one another, cyclopentyl, cyclohexyl and cycloheptyl radicals, which can be further substituted, for example by halogen, such as fluorine, chlorine and bromine, $C_{1-4}$-alkyl, such as methyl, ethyl, propyl and isopropyl, and $C_{1-4}$-alkoxy, such as methoxy. An example is the methylcyclohexyl radical.

A phenyl radical $R_4$ can be further substituted, for example by $C_{1-4}$-alkyl groups, such as methyl, ethyl, propyl, isopropyl and butyl, $C_{1-4}$-alkoxy groups, such as methoxy and ethoxy, and halogen, such as fluorine, chlorine and bromine.

A $C_{1-4}$-alkyl radical X in formula (1) is, for example, a methyl, ethyl, propyl, isopropyl, butyl, sec.-butyl, isobutyl or tert.-butyl radical.

A $C_{1-4}$-alkoxy radical X is, for example, a methoxy, ethoxy, propoxy, isopropoxy, butoxy, isobutoxy, sec.-butoxy or tert.-butoxy radical.

The monoazo dyes of the formula (1) in which
(a) X is bonded to the sulfophenyl ring in the p-position relative to the $—SO_2—$ group,
(b) R is bonded to the phenyl ring in the o-or p-position relative to the $—SO_2—$ group; and
(c) the radical $—N=N—K$ is bonded to the phenyl ring in the o- or p-position relative to the $—SO_2—$ group, are preferred.

The coupling component (K) in the monoazo dyes of the formula (1) can be substituted by fibre-reactive groups. Examples of suitable fibre-reactive groups are those of the aliphatic series, such as acryloyl, mono-, di- or tri-chloro- or mono-, di- or tri-bromo-acryloyl or -methacryloyl, such as $—CO—CH=CH—Cl$, —CO—CCl=CH₂, —CO—CH=CHBr, —COCBr=CH₂, —CO—CBr=CHBr, —CO—CCl=CH—CH₃, and furthermore —CO—CCl=CH—COOH, —CO—CH=CCl—COOH, 2-chloropropionyl, 3-phenylsulfonylpropionyl, 3-methylsulfonylpropionyl, vinylsulfonyl, β-chloroethylsulfonyl, β-sulfatoethylsulfonyl, β-methylsulfonylethylsulfonyl, β-phenylsulfonylethylsulfonyl, 2-fluoro-2-chloro-3,3-difluorocyclobutane-1-carbonyl, 2,2,3,3-tetrafluorocyclobutane-1-carbonyl or -1-sulfonyl, β-(2,2,3,3-tetrafluorocyclobut-1-yl)-acryloyl, and α- or β-alkyl- or -aryl-sulfonyl-acryloyl, such as α- or β-methylsulfonylacryloyl.

Reactive radicals which are particularly suitable for synthetic polyamide and wool are chloroacetyl, bromoacetyl, α,β-dichloro- or α,β-dibromo-propionyl, α-chloro- or α-bromoacryloyl, 2,4-difluoro-5-chloropyrimid-6-yl, 2,4,6-trifluoropyrimid-5-yl, 2,4-dichloro-5-methylsulfonylpyrimid-6-yl, 2,4-difluoro-5-methylsulfonylpyrimid-6-yl and 2,4-difluorotriazin-6-yl, and fluorotriazinyl radicals of the formula

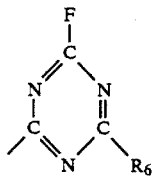

in which R₆ is a substituted or unsubstituted amino group or a free or etherified oxy or thio group, for example the NH₂ group, an amino group which is mono- or di-substituted by $C_{1-4}$-alkyl radicals, a $C_{1-4}$-alkoxy group, a $C_{1-4}$-alkylmercapto group, arylamino, in particular phenylamino, or phenylamino, which is substituted by methyl, methoxy, chlorine or, in particular, sulfo, phenoxy, monosulfophenoxy, disulfophenoxy or the like and the corresponding chlortriazinyl radicals.

Examples of starting materials for introducing such triazine radicals are 2,4-difluoro- or 2,4-dichloro-6-aminotriazine, 2,4-difluoro- or 2,4-dichloro-6-methylaminotriazine, 2,4-difluoro- or 2,4-dichloro-6-ethylaminotriazine, 2,4-difluoro-or 2,4-dichloro-6-phenylaminotriazine, 2,4-difluoro-or 2,4-dichloro-6-(2',3'- or 4'-sulfophenyl)-aminotriazine, 2,4-difluoro- or 2,4-dichloro-6-(2',4'- or 3',4'- or 2',5'-or 4',5'-disulfophenyl)-aminotriazine, 2,4-difluoro- or 2,4-dichloro-6-dimethylaminotriazine, 2,4-difluoro- or 2,4-dichloro-6-methoxytriazine, 2,4-difluoro- or 2,4-dichloro-6-(β-methoxyethoxy)-triazine, 2,4-difluoro- or 2,4-dichloro-6-methylmercaptotriazine, 2,4-difluoro- or 2,4-dichloro-6-phenylmercaptotriazine and 2,4,6-trichloro- or 2,4,6-trifluorotriazine.

Particularly preferred monoazo dyes of the formula (1) are those in which K is an N-$C_{1-4}$-alkylamino- or N,N-di-$C_{1-4}$-alkylamino-benzene radical which can be substituted in the benzene ring by methyl, methoxy, chlorine and acetylamino and in which the N-alkyl radicals independently of one another can be substituted by hydroxyl, chlorine, cyano or phenyl, a methoxybenzene radical which can be substituted in the benzene ring by methyl, a methoxynaphthalene radical, an aminonaphthalene radical which can be substituted by sulfo, a hydroxynaphthalene radical which can be substituted by sulfo, an aminonaphthol radical which can be substituted in the naphthalene nucleus by sulfo and in which the amino group can be substituted by methyl, α,β-dibromopropionyl, α,β-dibromopropionylaminobenzoyl and 2,6-difluoro-5-chloropyrimidylaminobenzoyl, a 1-phenyl-3-methylpyrazolone radical which can be substituted in the phenyl radical by methyl, ethyl and chlorine, a 1-phenyl-3-methylaminopyrazole radical which can be substituted in the phenyl radical by chlorine and sulfo, a 2-methyl- or 2-phenyl-indole radical which can be substituted in the 1-position by ethyl, an N-methyl- or N-ethyl-1,2,3,4-tetrahydroquinoline radical or a 1-chlorophenylamino-2-pentylnaphthimidazole radical which is substituted in the naphthalene nucleus by hydroxyl and sulfo, and R is hydrogen, chlorine, methyl, trifluoromethyl, carboxyl or a —SO₂—$C_{1-2}$—alkyl,

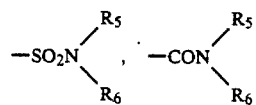

or —CO—R₇ group, in which R₅ is hydrogen or $C_{1-3}$-alkyl, R₆ is hydrogen, $C_{1-6}$-alkyl which can be substituted by hydroxyl or methoxy, or cyclohexyl and R₇ is phenyl or chlorophenyl, and X is hydrogen, methyl, chlorine or ethoxy, and in which R may not be hydrogen or chlorine if the radical —N=N—K is bonded to the phenyl ring in the o-position relative to the —SO₂— group and K is the radical of a 2-amino-8-hydroxynaphthalene-6-sulfonic acid.

Particularly preferred monoazo dyes of the formula (1) are those in which K is an N,N-di-$C_{1-4}$-alkylaminobenzene radical which can be substituted in the benzene nucleus by methyl, methoxy, chlorine and acetylamino and in which the N-alkyl radicals independently of one another can be substituted by hydroxyl, chlorine, cyano or phenyl, a 1-phenyl-3-methylaminopyrazole radical which can be substituted in the phenyl radical by chlorine and sulfo, or a 2-methyl- or 2-phenylindole radical which can be substituted in te 1-position by ethyl.

The monoazo dyes of the formula

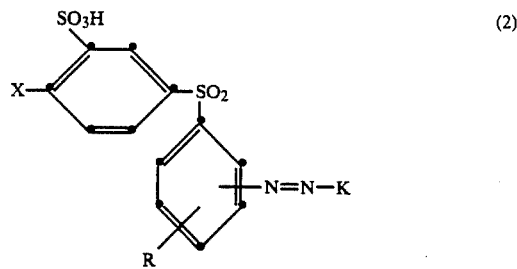

(2)

in which K, R and X are as defined above and R and the radical —N=N—K are bonded to the phenyl ring in the o- or p-positive relative to the —SO₂-group are also preferred.

Particularly preferred monoazo dyes of the formula (2) are those in which K is a 2-methyl- or 2-phenylindole radical, an N,N-diethyl-3-acetylaminoanile radical, an N,N-diethyl- or N,N-dibutyl-3-methylaniline radical, an N-ethyl-N-phenethyl-3-methylaniline radical or a 1-phenyl-3-methylaminopyrazole radical, X is hydrogen, chlorine or methyl and R is hydrogen, chlorine, trifluoromethyl, ethylsulfonyl, p-chlorobenzoyl, sulfamoyl, N-methylsulfamoyl, N,N-dimethylsulfamoyl, N,N-diethylsulfamoyl or N-methyl-N-cyclohexylsulfamoyl.

The invention furthermore relates to a process for the preparation of the monoazo dyes of the formula (1). The process comprises diazotising a diazo component of the formula

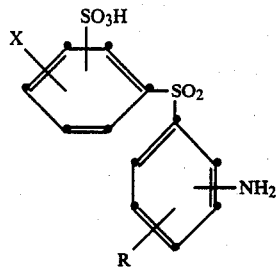
(3)

and coupling the diazotisation product to a coupling component of the formula

H-K (4)

in which K, R and X in formulae (3) and (4) are as defined under formula (1).

The diazo components of the formula (3) are as a rule diazotised by the action of nitrous acid in aqueous-mineral acid solution at a low temperature, and the coupling to the coupling component of the formula (4) is as a rule carried out at acid, neutral to alkaline pH values.

If appropriate, a free amino group in the radical K can be converted into an acylamino or alkylamino group with an acylating or alkylating agent after the coupling, and a hydroxyl group in the radical K can likewise be converted into an alkoxy group by alkylation.

The azo dyes of the formula (1) which contain a fibre-reactive radical are prepared by reacting a diazo component of the formula (3), a coupling component of the formula (4) containing an acylatable amino or hydroxyl group and an acylating agent containing a fibre-reactive radical with one another in any sequence.

Coupling components containing an acylatable group which are preferably used are those of the benzene or naphthalene series.

In preferred process variants, a diazo component of the formula (3) in which (a) X is bonded to the sulfophenyl ring in the p-position relative to the —SO$_2$— group;
(b) R is bonded to the phenyl ring in the o- or p-position relative to the —SO$_2$— group; and
(c) the NH$_2$ group is bonded to the phenyl ring in the o- or p-position relative to the —SO$_2$— group, is used.

The preferred monoazo dyes of the formula (1) are prepared by diazotising a diazo component of the formula (3) in which R is hydrogen, chlorine, methyl, trifluormethyl, carboxyl or an —SO$_2$—C$_{1-2}$—alkyl, —SO$_2$—benzyl,

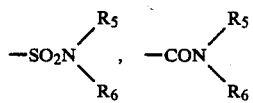

or —CO—R$_7$ group, in which R$_5$ is hydrogen or C$_{1-4}$-alkyl, R$_6$ is hydrogen, C$_{1-6}$-alkyl, which can be substituted by hydroxyl or methoxy, or cyclohexyl and R$_7$ is phenyl or chlorophenyl, and X is hydrogen, methyl, chlorine or ethoxy, and coupling the diazotisation product to a coupling component of the formula (4) in which K is an N-C$_{1-4}$-alkylamino- or N,N-di-C$_{1-4}$-alkylaminobenzene radical which can be substituted in the benzene ring by methyl, methoxy, chlorine and acetylamino and in which the N-alkyl radicals independently of one another can be substituted by hydroxyl, chlorine, cyano or phenyl, a methoxybenzene radical which can be substituted in the benzene ring by methyl, a methoxynaphthalene radical, an aminonaphthalene radical which can be substituted by sulfo, a hydroxynaphthalene radical which can be substituted by sulfo, an aminonaphthol radical which can be substituted in the naphthalene nucleus by sulfo and in which the amino group can be substituted by methyl, α,β-dibromopropionyl, α,β-dibromopropionylaminobenzoyl and 2,6-difluoro-5-chloropyrimidylaminobenzoyl, a 1-phenyl-3-methylpyrazolone radical which can be substituted in the phenyl radical by methyl, ethyl and chlorine, a 1-phenyl-3-methylaminopyrazole radical which can be substituted in the phenyl radical by chlorine and sulfo, a 2-methyl-or 2-phenyl-indole radical which can be substituted in the 1-position by ethyl, an N-methyl- or N-ethyl-1,2,3,4-tetrahydroquinoline radical or a 1-chlorophenylamino-2-pentylnaphthimidazole radical which is substituted in the naphthalene nucleus by hydroxyl and sulfo, and in which R in the diazo component may not be hydrogen or chlorine if the NH$_2$ group is bonded to the phenyl ring in the o-position relative to the —SO$_2$— group and 2-amino-8-hydroxynaphthalene-6-sulfonic acid is used as the coupling component.

In particular, a coupling component of the formula (4) in which K is an N,N-di-C$_{1-4}$-alkylaminobenzene radical which can be substituted in the benzene nucleus by methyl, methoxy, chlorine and acetylamino and in which the N-alkyl radicals independently of one another cna be substituted by hydroxyl, chlorine, cyano or phenyl, a 1-phenyl-3-methylaminopyrazole radical which can be substituted in the phenyl radical by chlorine and sulfo or a 2-methyl- or 2-phenyl-indole radical which can be substituted in the 1-position by ethyl, is used.

In particular, a diazo component of the formula

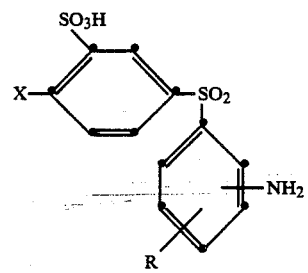
(5)

in which R and X are as defined above, is used.

The particularly preferred monoazo dyes of the formula (1) are prepared by diazotising a diazo component of the formula (5) in which X is hydrogen, chlorine or methyl and R is hydrogen, chlorine, trifluoromethyl, ethylsulfonyl, p-chlorobenzoyl, sulfamoyl, N-methylsulfamoyl, N,N-dimethylsulfamoyl, N,N-diethylsulfamoyl or N-methyl-N-cyclohexylsulfamoyl and coupling the diazotisation product to a coupling component of the formula (4) in which K is a 2-methyl- or 2-phenylindole radical, an N,N-diethyl-3-acetylaminoaniline radical, an N,N-diethyl-or N,N-dibutyl-3-methylaniline radical, an N-ethyl-N-phenythyl-3-methylaniline radical or a 1-phenyl-3-methylaminopyrazole radical.

Examples of the large number of possible coupling components are the following: aniline, dimethylaniline, diethylaniline, 3-methyldimethylaniline, 3-methyldibutylaniline, 3-methyldiethylaniline, 3-acetylamino- or 3-methoxycarbonylamino-or 3-ureidodimethylaniline, 3-methyl-6-methoxydiethylaniline, 3-methyl-N-ethyl-N-butylaniline, 2,5-dimethoxydiethylaniline, N-ethyl-N-benzylaniline, N-ethyl-N-(β-cyanoethyl)-aniline, N-ethyl-N-(β-hydroxyethyl)-aniline, N-ethyl-N-(β-acetoxyethyl)-aniline, N,N-dibutylaniline, 3-acetylamino-N,N-diethylaniline, N-methyl-N-(β-cyanoethyl)-aniline, 3-methyl-N,N-di-(β-cyanoethyl)-aniline, 3-chloro-N,N-dimethylaniline, 3-methyl-N-ethyl-N-benzylaniline, 3-methyldipropylaniline, N,N-di-n-propylaniline, 3-acetylamino-N,N-di-(β-hydroxyethyl)-aniline, 3-methyl-N,N-di-(β-acetoxyethyl)-aniline, 3-methyl-N-ethyl-N-(3'-sulfobenzyl)-aniline, N-ethyl-N-(β-chloroethyl)-aniline, 2-methoxy-5-acetylamino-N-benzylaniline, 2-methoxy-5-acetylamino-N-(β-acetoxyethyl)-N-benzylaniline, 3-methyl-N-ethyl-N-propylaniline, 3-methyl-N-ethyl-N-(β-cyanoethyl-or β-hydroxyethyl)-aniline, 2-methyl-5-acetylamino-N,N-dimethylaniline, 2-chloro-5-acetylamino-N,N-dimethylaniline, 2-chloro-5-acetylamino-N-(γ-phenoxy-β-hydroxy-n-propyl)-aniline, 3-ureidoaniline, N-ethyl-N-(β-hydroxyethyl)-aniline, N-ethyl-N-(3'-sulfobenzyl)-aniline, 3-methyl-N-ethyl-N-(β-sulfoethyl)-aniline, 3-benzoylamino-N,N-diethylaniline, 3-(p-tolylsulfamoyl)-N,N-diethylaniline, 3-(p-chlorobenzoylamino)-N,N-diethylaniline, 3-methoxy-N,N-diethylaniline, 3-methyl-N,N-di-(β-hydroxyethyl)-aniline, 3-methyl-6-methoxy-N,N-di-(β-hydroxyethyl)-aniline, 3-acetylaminoaniline, 3-methyl-N-ethyl-N-phenethylaniline, N,N-di-(β-cyanoethyl)-aniline, 3-acetylamino-N,N-di-(β-cyanoethyl)-aniline, 3-methyl-N-ethyl-N-(β-hydroxyethyl)-aniline, 3-methyl-N-ethyl-N-(β-cyanoethyl)-aniline, N-(β-cyanoethyl)-aniline, N-methyl-N-benzylaniline, phenol, 3-methylphenol, 3,4-dimethylphenol, 2-phenylphenol, 1-hydroxy-4-methoxybenzene, 1-hydroxy-4-tert.-butylbenzene, 1-hydroxy-7-amino-3-sulfonaphthalene, 1-hydroxy-7-methylamino- or -7-phenylamino-3-sulfonaphthalene, 2-aminonaphthalene, 2-amino-6-sulfonaphthalene, 2-amino-5-acetylaminomethylnaphthene, β-naphthol, 2-amino-5-methylaminosulfonylnaphthalene, 1-hydroxy-8-amino-3,6-or -3,5-disulfonaphthalene, 1-hydroxy-8-benzoylamino-3,6- or -3,5-disulfonaphthalene, 1-hydroxy-8-ureido-3,6-or -3,5-disulfonaphthalene, 1-hydroxy-8-acetylamino-3,6- or -3,5-disulfonaphthalene, 1-(3'-chlorophenyl)-3-methylpyrazol-5-one, 1-(2'-chloro-6'-methylphenyl)-3-methylpyrazol-5-one, 1-phenyl-3-methylpyrazol-5-one, 1-(2',3'- or 4'-sulfophenyl)-3-methylpyrazol-5-one, 1-(2'-chloro-4'- or 5'-sulfophenyl)-3-methylpyrazol-5-one, 1-(3'- or 4'-α,β-dibromopropionylamino)-benzoylamino-8-hydroxy-3,6- or 4,6-disulfonaphthalene, 2-α,β-dibromopropionylamino-8-hydroxy-6-sulfonaphthalene, 3-α,β-dibromopropionyl-N-methylamino-8-hydroxy-6-sulfonaphthalene, 1-[3'-(2'',5''-difluoro-5''-chloropyrimidylamino)-benzoylamino]8-hydroxy-4,6-disulfonaphthalene, 1-(2'-methyl-4'-sulfophenyl)-3-methylpyrazol-5-one, 1-[4',8'-disulfonaphth-2-yl]-3-methyl-pyrazol-5-one, 1[5',7'-disulfonaphth-2-yl]-3-methylpyrazol-5-one, 1-(2'-chloro-5'-sulfophenyl)-3-methyl-5-aminopyrazole, 1-(2'-chloro-4'-sulfophenyl)-3-methyl-5-aminopyrazole, 1-(3'- or 4'-sulfophenyl)-3-methyl-5-aminopyrazole, 2-methylindole, 2-phenylindole, 1-methyl-2-phenylindole, 1-octyl-2-methylindole, N-methyl-N,N-diphenylamine, acetoacetanilide, 1-(4'-methylphenyl)-3-methylpyrazole-5-one, 1-ethyl-2-methylindole, 1-phenyl-3-methyl-5-aminopyrazole, 1-hydroxynaphthalene, 1-hydroxy-4-sulfonaphthalene, 1-(2'-chlorophenylamino)-9-hydroxy-2-methyl-1H-naphtho(1.2-d)imidazole-7-sulfonic acid, 1-(2'-chlorophenylamino)-9-hydroxy-2-pentyl-1H-naphtho(1.2-d)imidazole-7-sulfonic acid, 1-(2-methyl-6-chlorophenyl)-3-methylpyrazol-5-one and N-methyl- or N-ethyl-1,2,3,4-tetrahydroquinoline.

The present invention also relates to the compounds of the formula

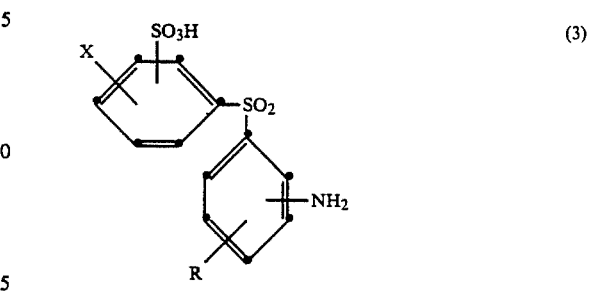

in which R is hydrogen, halogen, $C_{1-6}$-alkyl, trifluoromethyl, carboxyl or an $—SO_2—C_{1-6}—$alkyl, $—SO_2—R_1$,

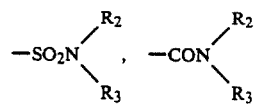

or $—CO—R_4$ group, in which $R_1$ is a substituted or unsubstituted benzyl, phenethyl or naphthylmethylene radical, $R_2$ and $R_3$ independently of one another are hydrogen, $C_{1-6}$-alkyl or $C_{5-7}$-cycloalkyl and $R_4$ is a phenyl radical which is unsubstituted or substituted by halogen, $C_{1-4}$-alkyl or $C_{1-4}$-alkoxy, and X is hydrogen, $C_{1-4}$-alkyl, $C_{1-4}$-alkoxy or halogen, and in which the radicals R and X may not be hydrogen or may not be chlorine or methyl in the p-position relative to the $—SO_2—$ group if the $NH_2$ group is bonded to the phenyl ring in the o-position relative to the $—SO_2—$ group, these compounds being used as diazo components.

Preferred compounds of the formula (3) are those in which (a) X is bonded to the sulfophenyl ring in the p-position relative to the $—SO_2—$ group;

(b) R is bonded to the phenyl ring in the o- or p-position relative to the $—SO_2—$ group; and (c) the $NH_2$ group is bonded to the phenyl ring in the o- or p-position relative to the $—SO_2—$ group.

Particularly preferred compunds of the formula (3) are those in which R is hydrogen, chlorine, methyl, trifluoromethyl, carboxyl or an $—SO_2—C_{1-2}$-alkyl, $—SO_2—$benzyl,

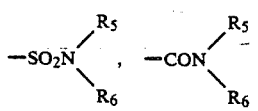

or $—CO—R_7$ group, in which $R_5$ is hydrogen or $C_{1-3}$-alkyl, $R_6$ is hydrogen, $C_{1-6}$-alkyl, which can be substituted by hydroxyl or methoxy, or cyclohexyl and R₇ is phenyl or chlorophenyl, and X is hydrogen, methyl, chlorine or ethoxy, and in which R and X may not be hydrogen or may not be chlorine or methyl in the p-position relative to the —SO₂— group if the —NH₂ group is bonded to the phenyl ring in the o-position relative to the —SO₂— group.

Particularly preferred compounds are those of the formula

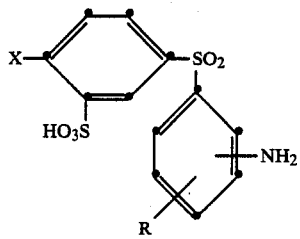

(5)

in which R and X are as defined above.

The compounds of the formula (3) are prepared by reacting a compound of the formula

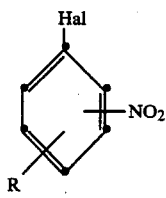

(6)

in which Hal is halogen and R is as defined under formula (3), with a compound of the formula

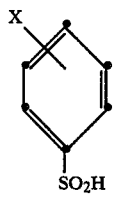

(7)

in which X is as defined under formula (3), sulfonating the reaction product and then reducing the NO₂ group to the amino group.

The compounds of the formulae (6) and (7) are known per se and can be obtained by known methods.

In one process variant, the compounds of the formula (3) in which X is hydrogen or halogen and R is an

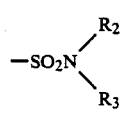

group, in which R₂ and R₃ independently of one another are hydrogen, $C_{1-6}$-alkyl or $C_{5-7}$-cycloalkyl can be obtained by reacting a compound of the formula

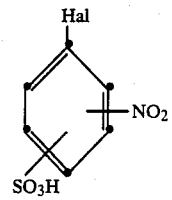

(8)

in which Hal is halogen, with a compound of the formula (7), in which X is hydrogen or halogen, converting the reaction product into a sulfonic acid halide, subsequently sulfonating the halide and then reacting the product with an amine of the formula

(9)

in which R₂ and R₃ are as defined above, and then reducing the NO₂ group to the amino group.

The procedures for the preparation of the compounds of the formula (3) are known per se. The reactions are carried out at temperatures between 0° and 150° C., if necessary under pressure in aqueous solution or mixtures of organic solvents, for example acetone and water, at pH values between 7 and 10. Reduction of the nitro group is also effected by methods which are known per se, for example in glacial acetic acid in the presence of iron powder. The sulfonic acid group is introduced by methods which are known per se, for example in 25% oleum at temperatures between 0° and 100° C.

The reaction product of the compounds of the formulae (8) and (7) is converted into the sulfonic acid halide, in particular the sulfochloride, by known methods for example by reaction of the sulfonic acid with phosphorus oxychloride in an organic medium, for example sulfolane or acetonitrile.

Examples of starting compounds of the formula (6) are 4-chloro-3-nitrophenyl ethyl sulfone, 4-chloro-3-nitrobenzene-1-sulfamide, 4-chloro-3-nitrobenzoic acid amide, 1,2-dichloro-3-nitrobenzene, 4,4'-dichloro-3-nitrobenzophenone, p-nitrochlorobenzene, 1,4-dichloro-2-nitrobenzene, o-nitrochlorobenzene, 4-chloro-3-nitrobenzene-sulfonic acid N,N-dimethylamide, 4-chloro-3-nitrobenzene-1-sulfonic acid N-methylamide, 4-chloro-3-nitrobenzene-1-sulfonic acid N,N-diethylamide, 4-chloro-3-nitrobenzene-1-sulfonic acid N-ethyl-, -propyl-, -isopropyl-, -butyl-, -sec.-butyl-, -isobutyl-, -tert.-butyl-, -pentyl-, -hexyl- or -cyclohexyl-amide, 4-chloro-3-nitrobenzene-1-sulfonic acid N-methyl-N-cyclohexalamide, 4-chloro-3-nitrobenzene-1-sulfonic acid N-β-hydroxyethyl- or -β-methoxyethylamide, 4-chloro-3-nitrobenzene-1-sulfonic acid N-methyl-N-β-hydroxyethylamide, 4-chloro-3-nitrobenzoic acid N-methyl-, -ethyl-, -propyl- or -butyl-amide, 4-chloro-3-nitrobenzoic acid N,N-dimethyl-, -ethyl-, -propyl- or -isopropyl-amide, 4-chloro-3-nitrobenzoic acid N-methyl-N-cyclohexyalamide, 4-chloro-3-nitrophenyl benzyl sulfone, 4-chloro-3-nitrophenyl methyl sulfone, 4-chloro-3-nitrobenzophenone, 4-chloro-3-nitro-1-trifluoromethylbenzene, 4-chloro-3nitrotoluene and 4-chloro-3-nitrobenzoic acid.

Examples of starting compounds of the formula (7) are benzenesulfinic acid, 4-methylbenzenesulfinic acid, 4-ethoxybenzenesulfinic acid and 4-chlorobenzenesulfinic acid.

Examples of starting compounds of the formula (8) are 4-chloro-3-nitrobenzenesulfonic acid and 2-chloro-5-nitrobenzenesulfonic acid.

Examples of the compounds of the formula (9) are ammonia, dimethylamine, methylamine, diethylamine, ethylamine, propylamine and N-methyl-N-cyclohexylamine.

Examples of the compounds of the formula (3) are 2-amino-4-ethylsulfonyl-1,1'-diphenylsulfone-3'-sulfonic acid, 2-amino-4'-chloro-4-ethylsulfonyl-1,1'-diphenylsulfone-3'-sulfonic acid, 2-amino-4'-methyl-4-sulfonylamide-1,1'-diphenylsulfone-3'-sulfonic acid, 2-amino-4'-methyl-4-carboxyamide-1,1'-diphenylsulfone-3'-sulfonic acid, 2-amino-4'-methyl-6-chloro-1,1'-diphenylsulfone-3'-sulfonic acid, 2-amino-4'-methyl-4-p-chlorobenzoyl-1,1'-diphenylsulfone-3'-sulfonic acid, 4-amino-4'-methyl-1,1'-diphenylsulfone-3'-sulfonic acid, 2-amino-4'-methyl-4-chloro-1,1'-diphenylsulfone-3'-sulfonic acid, 2-amino-4'-chloro-1,1'-diphenylsulfone-3'-sulfonic acid, 2-amino-4'-methyl-4-(sulfonic acid N,N-dimethyl-, -ethyl-, -propyl-, -isopropyl- or -butyl-amide)-1,1'-diphenylsulfone-3'-sulfonic acid, 2-amino-4'-methyl- or -4'-chloro-4-(sulfonic acid N-methyl-, -ethyl-, -β-hydroxyethyl-β-methoxyethyl-, -propyl-, -isopropyl-, -butyl-, -sec.-butyl-, -isobutyl-, -tert.-butyl-, -pentyl-, -hexyl- or -cyclohexyl-amide)-1,1'-diphenylsulfone-3'-sulfonic acid, 2-amino-4-(sulfonic acid N-methyl-, -ethyl-, -propyl-, -isopropyl-, -butyl-, -sec.-butyl-, -isobutyl-, -tert.-butyl-, -pentyl-, -hexyl- or -cyclohexyl-amide)-1,1'-diphenylsulfone-3'-sulfonic acid, 2-amino-4-(sulfonic acid N-methyl-N-cyclohexylamide)-1,1'-diphenylsulfone-3'-sulfonic acid, 2-amino-4'-methyl-4-(sulfonic acid N-methyl-N-cyclohexylamide)-1,1'-diphenylsulfone-3'-sulfonic acid, 2-amino-4-carboxamide-1,1'-diphenylsulfone-3'-sulfonic acid, 2-amino-4'-methyl- or -4'-chloro-4-methyl-, -ethyl- or -benzyl-sulfonyl-1,1'-diphenylsulfone-3'-sulfonic acid, 2-amino-4'-chloro- or -4'-methyl-4-benzoyl- or -4-p-chlorobenzoyl-1,1'-diphenylsulfone-3'-sulfonic acid, 2-amino-4'-methyl- or -4'-chloro-4-trifluoromethyl-1,1'diphenylsulfone-3'-sulfonic acid, 2-amino-4,4'-dichloro-1,1'-diphenylsulfone-3'-sulfonic acid, 2-amino-4'-methyl-4-carboxy-1,1'-diphenylsulfone-3'-sulfonic acid, 2-amino-4,4'-dimethyl-1,1'-diphenylsulfone-3'-sulfonic acid and 2-amino-4-trifluoromethyl-1,1'-diphenylsulfone-3'-sulfonic acid.

The dyes of the formula (1) according to the invention are either in the form of their free sulfonic acid or, preferably, as salts thereof.

Examples of suitable salts are the alkali metal, alkaline earth metal or ammonium salts or the salts of an organic amine. Examples are the sodium, lithium, potassium or ammonium salts and the triethanolamine salt.

The dyes of the formula (1) are suitable for dyeing and printing materials containing amide groups, such as textile fibres and textile threads and fabrics of wool, silk and polyurethane fibres, but especially for dyeing and printing synthetic polyamide, the conventional dyeing methods being used and level dyeings being obtained.

They are distinguished by their brilliance and depth of colour, good exhaustion and very good build-up capacity. The dyeings are distinguished by generally good fastness properties, such as fastness to rubbing, acid and alkali and wet-fastness properties, in particular fastness to washing, water, hot water and perspiration. Their very good light-fastness and very good stability towards formaldehyde is to be particularly emphasised. They are also distinguished by their little sensitiveness to acid, that means the storage stability of the dyes in an acidic dyebath or print paste is very good.

Dyestuffs according to the invention are distinguished with respect to the closest comparable known monoazo dyestuffs of European patent application No. 0 042 357 by their good storage stability to acid, exhaustion or colorfastness to perspiration, water and hot water; and with respect to the closest comparable known monoazo dyestuffs of French Pat. No. 871.731 by good exhaustion and colorfastness to perspiration and water.

In the examples which follow, parts are by weight. The temperatures are in degrees Centigrade. Parts by weight bear the same relation to parts by volume as that of the gram to the cubic centimeter.

EXAMPLE 1

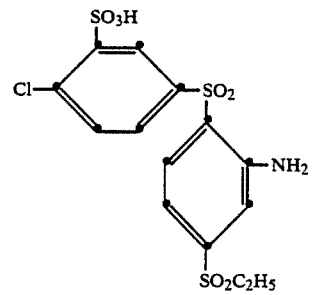

149.1 g of moist 4-chloro-3-nitro-phenyl ethyl sulfone (50.2% pure) are stirred in 150 ml each of methanol and dimethylsulfoxide together with 86.7 g of Na 4-chlorobenzenesulfinate (68.8% pure) at 68°–72° for 5hours. The product is filtered off at room temperature, washed with methanol and water and dried in a vacuum cabinet at 60°–70°. Melting point: 215°–218°.

109 g of the resulting compound are sulfonated in 250 ml of 25% oleum at 65°–68° in the course of about 5 hours. The mass obtained by precipitation on ice is filtered off, stirred in water and dissolved with concentrated sodium hydroxide solution at pH 7. After addition of sodium chloride, the product is filtered off with suction. The moist filter-cake is introduced into 200 ml of water containing 50 g of iron powder and 3 ml of glacial acetic acid and the mixture is subsequently stirred at the boiling point for 20 minutes. After careful addition of 5 g of sodium carbonate, the iron residue is filtered off. The filtrate is diluted with concentrated sodium chloride solution and the resulting precipitate is washed with sodium chloride solution, after filtration, and dried in a vacuum cabinet at 60°–70°.

102 g of a light grey powder are obtained.

EXAMPLE 2

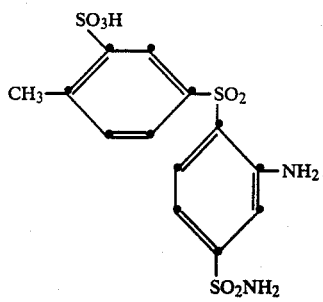

70.95 g of 4-chloro-3-nitrobenzene-1-sulfamide, 58.65 g of Na toluene-4-sulfinate (95.6% pure) and 12.3 g of calcined sodium acetate are stirred in 150 ml of dimethylsulfoxide at 40°–45° for 2½ hours. The mixture is diluted with 375 ml of alcohol and 750 ml of water and the product which has precipitated is filtered off with suction. The filter-cake is washed with hot water and dried in a vacuum cabinet at 60°–70°. Melting point: 181°–185°.

101 g of the resulting compound are introduced into 275 ml of 25% oleum and the solution formed is subsequently stirred for 4 hours. the sulfo substance is precipitated by discharging the mixture onto ice and adding sodium chloride and is filtered off and washed with sodium chloride solution.

The moist filter-cake is introduced into 300 ml of water containing 40 g of iron powder and 4 ml of glacial acetic acid and is reduced at the boiling point for 20 minutes. After careful addition of 60 ml of 1 molar sodium carbonate solution, the iron residue is filtered off and the amine is precipitated by adding sodium chloride. After filtration and drying, 103.7 g of chromatographically pure product of the above formula are obtained.

EXAMPLE 3

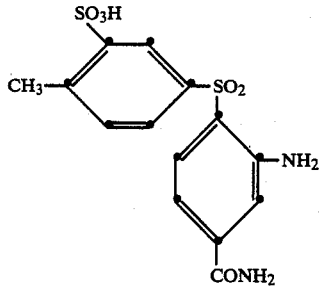

61.8 g of 4-chloro-3-nitrobenzoic acid (98% pure), 65.9 g of toluene-4-sulfinic acid (89.3% pure) and 24.6 g of calcined sodium acetate are warmed to 115° in 150 ml of dimethylsulfoxide, while stirring. After 1 hour, the reaction mass is poured onto cold water and rendered acid to Congo red with concentrated hydrochloric acid. The residue is filtered off, washed with water and dried in a vacuum cabinet at 60°–75°. 94.5 g of a powder are obtained.

72.1 g of this compound are reacted with 21.7 ml of thionyl chloride in 300 ml of chloroform and 2 ml of dimethylformamide at the boiling point to give the carboxylic acid chloride. The clear solution is diluted with 300 ml of petroleum ether and the resulting precipitate is filtered off and briefly dried. 72.8 g of acid chloride are obtained. Melting point: 162°–164°. 37.4 g of this product are introduced into 100 ml of concentrated ammonia solution and the mixture is subsequently stirred at room temperature for 3 hours. The amide is filtered off, washed with water and dried in vacuo at 60°–70°. 35 g of a powder of melting point 227°–230° are obtained. 33.8 g of the amide are sulfonated in 90 ml of oleum at room temperature for 25 hours. The solution is poured onto ice and the product is precipitated with potssium chloride. The precipitate is filtered off, washed with sodium chloride solution and dried to give 46.8 g of a grey powder.

45.8 g of the nitro substance are introduced into 200 ml of water containing 20 g of iron powder and 2 ml of glacial acetic acid and the mixture is stirred at the boiling point for 15 minutes. After careful addition of 30 ml of 1 molar sodium carbonate solution, the iron residue is filtered off. The product of the above formula is precipitated with sodium chloride and filtered off. The residue on the filter is washed with sodium chloride solution and then dried in a vacuum cabinet at 60°–70°.

The yield is 38.7 g.

EXAMPLE 4

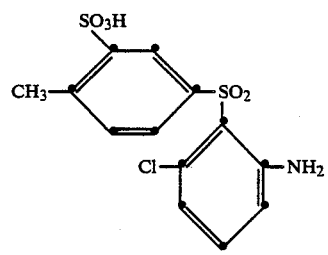

57.6 g of 1,2-dichloro-3-nitrobenzene and 55.8 g of Na toluene-4-sulfinate (95.6% pure) are stirred in 150 ml of dimethylsulfoxide at 65°–70° until a yellow, salt-containing solution has formed. The solution is diluted with 150 ml of alcohol and 500 ml of water. The precipitate is filtered off, washed and dried in vacuo at 60°–70°.

81.3 g of a powder of melting point 132°–138° are obtained. 80.2 g of this powder are sulfonated in 206 ml of oleum (25% pure). The mass obtained by precipitation on ice is filtered off and then neutralised in water with concentrated sodium hydroxide solution. The product is filtered off with suction and dried at 60°–70° in vacuo to give a yield of 99.3 g.

The nitro product is introduced into 300 ml of water containing 50 g of iron powder and 3 ml of glacial acetic acid and the mixture is subsequently stirred up to the boiling point for 30 minutes. After carefully sprinkling in 4.7 g of sodium carbonate, the iron residue is filtered off. The end product of the above formula is precipitated by adding sodium chloride, isolated in a chromatographically pure form by filtration and dried in vacuo up to 60°–70°. The yield is 96.7 g.

EXAMPLE 5

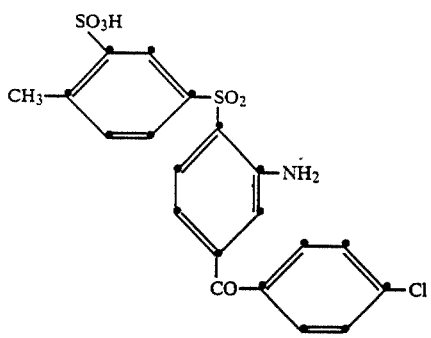

201.5 g of 4-chloro-3-nitrobenzoic acid are reacted with 100 ml of thionyl chloride and a catalytic amount of dimethylformamide in 600 ml of chlorobenzene to give the carboxylic acid chloride. The resulting solution is concentrated to 400 ml, 175 g of aluminium chloride are introduced and the mixture is warmed gradually to 75° until no further hydrogen chloride escapes. Ice-water and concentrated hydrochloric acid are carefully added and the organic phase is separated off and washed thoroughly with water and sodium carbonate solution. After the solvent has been evaporated off, the residue is recrystallised from methanol. 183 g of a compound of melting point 83°–85° are obtained.

74 g of this compound are reacted with 57.1 g of Na toluene-4-sulfinate (92.7% pure) in 100 ml of dimethylsulfoxide at 60° to give the sulfone derivative. The product is poured onto water, filtered off, washed and dried in vacuo at 60°–70°. Melting point: 191°–194°. 103 g of the resulting compound are sulfonated in 215 ml of oleum (25% pure). The product is precipitated with ice, filtered off, washed and dried in vacuo at 60°–70°. 125 g of the nitro substance are introduced into 400 ml of water containing 40 g of iron powder and 4 ml of glacial acetic acid and the mixture is subsequently stirred at the boiling point for 30 minutes. After careful addition of 5.2 g of sodium carbonate, the iron residue is filtered off. The precipitate obtained on cooling is filtered off, washed and dried in vacuo at 60°–70°.

92.9 g of chromatographically pure substance are obtained.

EXAMPLE 6

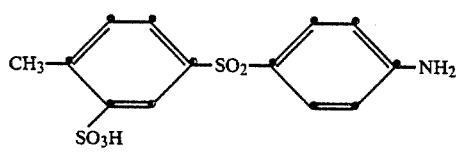

68.04 g of p-nitrochlorobenzene and 107.5 g of Na toluene-4-sulfinate (89.3% pure) are stirred in 145 ml of dimethylsulfoxide to give a homogeneous mixture and the mixture is left at 80° for 8 hours. It is diluted with water and the precipitate is filtered off, washed with water and dried in a vacuum cabinet at 60°–70°. 111.6 g of a powder of melting point 161°–167° are obtained. 110.4 g of this compound are sulfonated in 336 ml of oleum (25% pure) at room temperature for 4½ hours. The product is precipitated by pouring the mixture onto ice and adding sodium chloride. The precipitate is filtered off and washed with sodium chloride solution to give, after drying, 267.5 g of a powder.

260.4 g of the nitro substance are reduced in 510 ml of water containing 80 g of iron powder and 5 ml of glacial acetic acid at the boiling point for ½ hour. After careful addition of 8.5 g of sodium carbonate, the iron residue is filtered off. Addition of concentrated hydrochloric acid gives a precipitate in the filtrate which is filtered off, washed with water and dried in vacuo at 60°–70°. The yield of the compound of the above formula is 114.3 g.

EXAMPLE 7

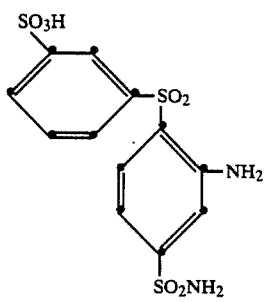

36.5 g of Na 2-nitro-diphenylsulfone-4-sulfonate are reacted with 36.5 g of phosphorus oxychloride in 50 ml each of sulfolane and acetonitrile at 68°–72° to give the sulfonic acid chloride. The mass obtained by precipitation on ice-water is filtered off, washed neutral with water and then dried over $P_2O_5$. Melting point: 157°–159°.

29.8 g of the acid chloride are sulfonated in 58 ml of oleum at 20°–37° for 25 hours. The product obtained by precipitation on ice with the addition of sodium chloride is filtered off and washed neutral with sodium chloride solution.

The material on the filter is converted into the amide in 125 ml of concentrated ammonia at 0°–5° and the amide is filtered off and washed with sodium chloride solution.

The moist filter-cake is introduced into 100 ml of water containing 15 g of iron powder and 1.5 ml of glacial acetic acid and the mixture is stirred at the boiling point for 20 minutes. After careful addition of 2.7 g of sodium carbonate, the iron residue is filtered off. The product is precipitated with potassium chloride, filtered off, washed and dried in a vacuum cabinet at 60°–70°.

EXAMPLE 8

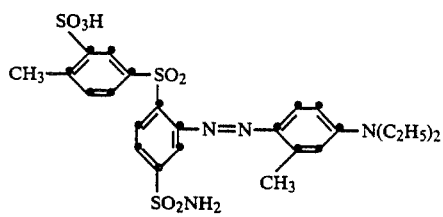

6.1 g of the compound from Example 2 (66.6% pure) are stirred in 40 ml of water, 10 g of ice and 2.5 ml of concentrated hydrochloric acid and diazotised with 2.5 ml of 4N sodium nitrite at 10°–18°. After some time, a slight excess of nitrite is destroyed with sulfamic acid. A solution of 1.63 g of N,N-diethyl-m-toluidine in 15 ml of water and 1.5 ml of concentrated hydrochloric acid is prepared and this is poured into the suspension of the diazonium salt. The pH is adjusted to 3.5 by addition of 2N sodium hydroxide solution and the dye which has precipitated is filtered off. After being taken up in 100 ml of water, the dye is dissolved under alkaline conditions, with addition of 2N sodium hydroxide solution, and precipitated again with sodium chloride. The dye is filtered off, washed with sodium chloride solution and dried in vacuo at 60°–70°.

5.15 g of dye which gives brilliant red shades on polyamide material when used for dyeing from a weakly acid bath are obtained. The dye has a very good fastness to light and good stability to formaldehyde and wet-fastness properties.

EXAMPLE 9

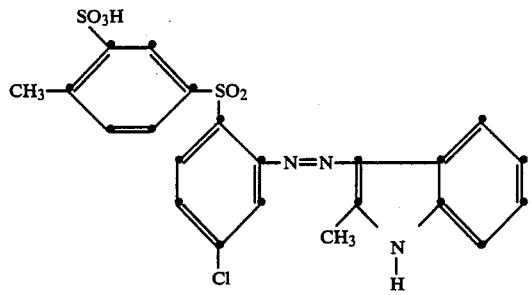

7.23 g of 2-amino-4-chlorodiphenylsulfone-4'-methyl-3'-sulfonic acid, prepared analogously to Examples 1–7, are stirred in 80 ml of water, 20 g of ice and 5 ml of concentrated hydrochloric acid and diazotised with 5 ml of 4N sodium nitrite at 8°–14°. After some time, a slight excess of nitrite is destroyed with sulfamic acid. A solution of 2.62 g of 2-methylindole in 5 ml of concentrated hydrochloric acid is added dropwise and coupling is brought to completion at pH 4, buffering being effected with sodium acetate. The dye is filtered off warm, washed with water and dried in a vacuum cabinet at 60°–70°. 8.65 g of dye which, when sodium carbonate is added, is readily water-soluble and dyes polyamide material in a brilliant reddish-tinged yellow shade from a weakly acid bath are obtained. The dye has a very good fastness to light and stability to acid and good wet-fastness properties.

EXAMPLE 10

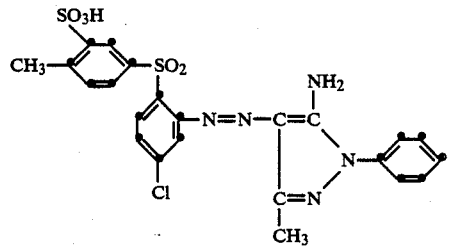

7.23 g of 2-amino-4-chlorodiphenylsulfone-4'-methyl-3'-sulfonic acid are diazotised as in Example 9. A solution of 3.59 g of 3-methyl-1-phenyl-5-pyrazolimine in 30 ml of water and 2.5 ml of concentrated hydrochloric acid is then added to the diazo solution and the coupling is allowed to go to completion at room temperature. The dye is filtered off, dissolved in 100 ml of water with 2N sodium hydroxide solution up to pH 7 and precipitated again with sodium chloride. It is filtered off with suction and dried in vacuo at 60°–70°.

9.35 g of dye which gives brilliant yellow shades on polyamide material when used for dyeing from a weakly acid bath are obtained. The dye has a very good fastness to light and good stability to formaldehyde and wet-fastness properties.

EXAMPLE 11

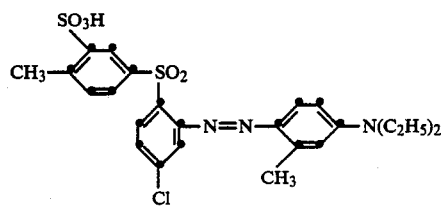

7.23 g of 2-amino-4-chlorodiphenylsulfone-4'-methyl-3'-sulfonic acid are diazotised as in Example 9. A solution of 3.26 g of N,N-diethyl-m-toluidine in hydrochloric acid is then added to the diazo solution and the coupling is brought to completion by addition of sodium acetate. The dye is dissolved in water at pH 7, precipitated with sodium chloride, filtered off with suction and dried in vacuo at 60°–70°.

8.8 g of dye which gives brilliant red shades on polyamide material when used for dyeing from a weakly acid bath are obtained. The dye has an outstanding build-up capacity and very good fastness to light, stability to formaldehyde and wet-fatness properties.

EXAMPLE 12

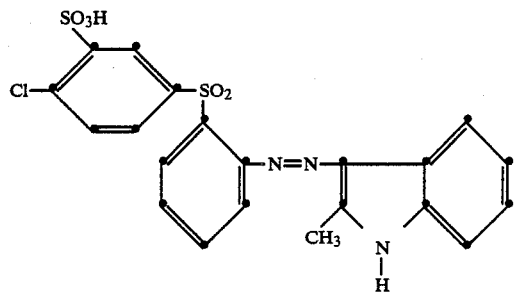

8.14 g of 2-amino-4'-chlorodiphenylsulfone-3'-sulfonic acid (85.4% pure) prepared analogously to Examples 1–7 are diazotised in 150 ml of water and 5 ml of concentrated hydrochloric acid with 5 ml of 4N sodium nitrite at 12°–15°. The suspension which forms is subsequently stirred for some time and a slight excess of nitrite is destroyed with sulfamic acid. 2.62 g of 2-methylindole, dissolved in concentrated hydrochloric acid, are now added dropwise and the coupling is allowed to go to completion at room temperature. The dye is filtered off with suction, dissolved in warm water at pH 7 and salted out with potassium chloride. The precipitate is filtered off, washed and dried in vacuo at 60°–70° to give 9.95 g of dye.

The dye dyes polyamide material in brilliant reddish-tinged yellow shades from a weakly acid bath. The dye has outstanding fastness to light and good stability to acid, stability to formaldehyde and wet-fastness properties.

EXAMPLE 13

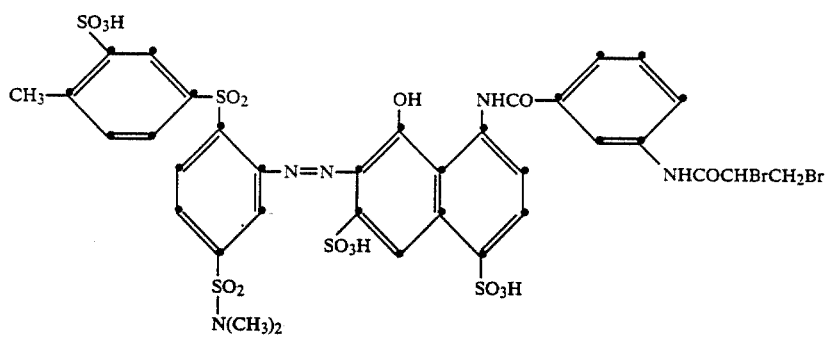

11.54 g of 2-amino-4-dimethylamidosulfone-4'-methyldiphenylsulfone-3'-sulfonic acid (75.2% pure), prepared analogously to Examples 1–7, are diazotised with 5 ml of 4N sodium nitrite in 70 ml of water and 5 ml of concentrated hydrochloric acid at 25°–28°. After some time, a slight excess of nitrite is destroyed with sulfamic acid.

23.66 g of 3-α,β-dibromopropionylaminobenzoyl-K acid (55.1% pure) are dissolved in 100 ml of water at pH 7 and the solution is cooled to 2°. The diazo suspension is added dropwise and the pH value is kept constant at pH 7 with sodium hydroxide solution. The dye is salted out with potassium chloride, filtered off with suction and dried in vacuo at 60°–70°. 18.71 g are obtained.

The procedure described in Examples 1 to 13 is repeated, except that a compound of the formula

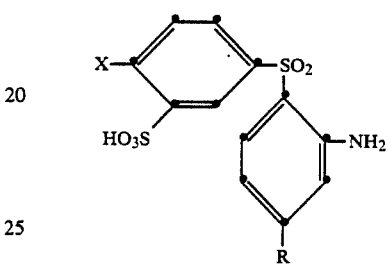

in which R and X are as defined in the table which follows, is used as the diazo component and the compounds listed in the table which follows are used as the coupling component, likewise affording useful dyes which have similarly good properties and dye polyamide and wool in the stated shade.

The examples labelled * below are obtained by coupling to the corresponding hydroxy compound and subsequent etherification of the hydroxyl group.

TABLE 1

| Example | Diazo component X | R | Coupling component | Shade on polyamide |
|---|---|---|---|---|
| 1 | —H | —SO$_2$NH$_2$ | ![structure: benzene with N(C$_2$H$_5$)$_2$ and CH$_3$] | red |
| 2 | —OC$_2$H$_5$ | " | " | " |
| 3 | —CH$_3$ | —SO$_2$NHCH$_3$ | " | " |
| 4 | —H | " | " | " |
| 5 | —CH$_3$ | —SO$_2$N(CH$_3$)$_2$ | " | " |
| 6 | —H | " | " | " |
| 7 | —CH$_3$ | —SO$_2$NHC$_2$H$_5$ | " | " |
| 8 | —H | " | " | " |
| 9 | —CH$_3$ | —SO$_2$N(C$_2$H$_5$)$_2$ | " | " |
| 10 | —H | " | " | " |
| 11 | —CH$_3$ | —SO$_2$NHC$_3$H$_7$ | " | " |
| 12 | —H | " | " | " |
| 13 | —CH$_3$ | —SO$_2$N(C$_3$H$_7$)$_2$ | " | " |
| 14 | —H | " | " | " |
| 15 | —CH$_3$ | —SO$_2$NHCH(CH$_3$)$_2$ | " | " |
| 16 | —H | " | " | " |
| 17 | —CH$_3$ | —SO$_2$NHC$_4$H$_9$ | " | " |
| 18 | —H | —SO$_2$NHC$_4$H$_9$ | ![structure: benzene with N(C$_2$H$_5$)$_2$ and CH$_3$] | red |
| 19 | —CH$_3$ | —SO$_2$NH—C(CH$_3$)$_3$ | " | " |
| 20 | —H | " | " | " |
| 21 | —CH$_3$ | —SO$_2$NHCH$_2$CH(CH$_3$)$_2$ | " | " |

TABLE 1-continued

| | Diazo component | | | Shade on |
|---|---|---|---|---|
| Example | X | R | Coupling component | polyamide |
| 22 | —H | " | " | " |
| 23 | —CH₃ | —SO₂NHCH₂(CH₂)₃CH₃ | " | " |
| 24 | —H | " | " | " |
| 25 | —CH₃ | —SO₂NHCH₂(CH₂)₄CH₃ | " | " |
| 26 | —H | " | " | " |
| 27 | —CH₃ | —SO₂NH—C₆H₄—H | " | " |
| 28 | —H | " | " | " |
| 29 | —CH₃ | —SO₂N(CH₃)—C₆H₄—H | " | " |
| 30 | —H | " | " | " |
| 31 | —CH₃ | —SO₂NHCH₂CH₂OH | " | " |
| 32 | —H | —SO₂NHCH₂CH₂OH | 3-methyl-4-(N,N-diethylamino)phenyl | red |
| 33 | —CH₃ | —SO₂N(CH₃)—CH₂CH₂OH | " | " |
| 34 | —H | " | " | " |
| 35 | —CH₃ | —SO₂NHCH₂CH₂OCH₃ | " | " |
| 36 | —H | " | " | " |
| 37 | —CH₃ | —CONH₂ | " | yellowish-tinged red |
| 38 | —H | " | " | " |
| 39 | —CH₃ | —CON(CH₃)₂ | " | " |
| 40 | —CH₃ | —CONHC₂H₅ | " | " |
| 41 | —CH₃ | —CON(C₂H₅)₂ | " | " |
| 42 | —CH₃ | —CON(CH₃)—C₆H₄—H | " | " |
| 43 | —CH₃ | —SO₂C₂H₅ | " | red |
| 44 | —H | " | " | " |
| 45 | —Cl | " | " | " |
| 46 | —Cl | —SO₂CH₂—C₆H₅ | 3-methyl-4-(N,N-diethylamino)phenyl | red |
| 47 | —H | " | " | " |
| 48 | —CH₃ | " | " | " |
| 49 | " | —SO₂CH₃ | " | " |
| 50 | —H | " | " | " |
| 51 | Cl | " | " | " |
| 52 | —CH₃ | —CO—C₆H₅ | " | " |
| 53 | " | —CO—C₆H₄—Cl | " | " |

TABLE 1-continued

| | Diazo component | | | Shade on |
|---|---|---|---|---|
| Example | X | R | Coupling component | polyamide |
| 54 | —H | —Cl | " | " |
| 55 | —Cl | " | " | " |
| 56 | —CH₃ | —CF₃ | " | " |
| 57 | —H | " | " | " |
| 58 | —Cl | " | " | " |
| 59 | —CH₃ | —CH₃ | " | " |
| 60 | —CH₃ | —COOH | " | " |
| 61 | —CH₃ | —SO₂NH₂ | benzene ring with —N(C₂H₅)₂ and NHCOCH₃ substituents | red |
| 62 | —H | " | " | " |
| 63 | —CH₃ | —SO₂NHCH₃ | " | " |
| 64 | —H | " | " | " |
| 65 | —CH₃ | —SO₂N(CH₃)₂ | " | " |
| 66 | —H | " | " | " |
| 67 | —CH₃ | —SO₂N(C₂H₅)₂ | " | " |
| 68 | " | —CONH₂ | " | yellowish-tinged red |
| 69 | " | —CON(C₂H₅)₂ | " | " |
| 70 | " | —SO₂CH₃ | " | red |
| 71 | " | —SO₂C₂H₅ | " | " |
| 72 | —Cl | " | " | " |
| 73 | —CH₃ | —Cl | " | " |
| 74 | " | —SO₂NH₂ | benzene ring with —N(C₂H₅)₂ | yellowish-tinged red |
| 75 | " | —SO₂N(C₂H₅)₂ | " | " |
| 76 | —Cl | —SO₂C₂H₅ | benzene ring with —N(C₂H₅)₂ | yellowish-tinged red |
| 77 | —CH₃ | —CF₃ | " | " |
| 78 | " | —Cl | " | " |
| 79 | " | —CON(CH₃)₂ | " | " |
| 80 | " | —SO₂NH₂ | benzene ring with —N(C₄H₉)₂ | " |
| 81 | " | —SO₂N(CH₃)₂ | " | " |
| 82 | " | —SO₂N(C₂H₅)₂ | " | " |
| 83 | " | —CF₃ | " | " |
| 84 | " | —Cl | " | " |
| 85 | " | —SO₂N(CH₃)— cyclohexyl H | " | " |
| 86 | " | —CON(CH₃)₂ | " | " |
| 87 | " | " | benzene ring with —N(CH₃)₂ and —CH₃ substituents | " |

TABLE 1-continued

| Example | Diazo component X | R | Coupling component | Shade on polyamide |
|---|---|---|---|---|
| 88 | —CH₃ | —SO₂NH₂ | 4-N(CH₃)₂, 3-CH₃ phenyl | yellowish-tinged red |
| 89 | " | —SO₂N(CH₃)₂ | " | red |
| 90 | —H | " | " | " |
| 91 | " | —SO₂NHCH₃ | " | " |
| 92 | —CH₃ | —SO₂NH₂ | 4-N(C₄H₉)₂, 3-CH₃ phenyl | red |
| 93 | —H | " | " | " |
| 94 | —CH₃ | —SO₂NHCH₃ | " | " |
| 95 | —H | " | " | " |
| 96 | —CH₃ | —SO₂N(CH₃)₂ | " | " |
| 97 | —H | " | " | " |
| 98 | —CH₃ | —SO₂N(CH₃)(phenyl) | " | " |
| 99 | —H | " | " | " |
| 100 | —CH₃ | —Cl | " | " |
| 101 | —H | —Cl | 4-N(C₄H₉)₂, 3-CH₃ phenyl | red |
| 102 | —CH₃ | —SO₂CH₃ | " | " |
| 103 | " | —SO₂C₂H₅ | " | " |
| 104 | —Cl | " | " | " |
| 105 | —CH₃ | —CF₃ | " | " |
| 106 | —H | " | " | " |
| 107 | —CH₃ | —SO₂NH₂ | N(C₂H₅)(CH₂-phenyl) phenyl | reddish-tinged orange |
| 108 | " | —SO₂N(CH₃)₂ | " | " |
| 109 | " | —CF₃ | " | " |
| 110 | " | —SO₂N(CH₃)₂ | 3-CH₃, N(C₂H₅)(CH₂-phenyl) phenyl | yellowish-tinged red |
| 111 | —CH₃ | —CF₃ | 3-CH₃, N(C₂H₅)(CH₂-phenyl) phenyl | yellowish-tinged red |
| 112 | " | —SO₂NHCH₃ | " | " |

TABLE 1-continued

| Example | Diazo component X | R | Coupling component | Shade on polyamide |
|---|---|---|---|---|
| 113 | " | —SO₂NH₂ | (N-ethyl, N-phenethyl amino-methylphenyl group) | red |
| 114 | —H | " | " | " |
| 115 | —CH₃ | —SO₂N(CH₃)₂ | " | " |
| 116 | " | —SO₂N(C₂H₅)₂ | " | " |
| 117 | —H | " | " | " |
| 118 | —CH₃ | —Cl | " | " |
| 119 | " | —CF₃ | " | " |
| 120 | —H | " | " | " |
| 121 | —CH₃ | —CONH₂ | " | yellowish-tinged red |
| 122 | —CH₃ | —SO₂NH₂ | (2-methylindole) | reddish-tinged yellow |
| 123 | —H | " | " | " |
| 124 | —CH₃ | —SO₂NHCH₃ | " | " |
| 125 | —H | " | " | " |
| 126 | —CH₃ | —SO₂N(CH₃)₂ | " | " |
| 127 | —H | " | " | " |
| 128 | —CH₃ | —SO₂N(C₂H₅)₂ | " | " |
| 129 | " | —CONH₂ | " | " |
| 130 | " | —CON(CH₃)₂ | " | " |
| 131 | " | —SO₂N(CH₃)(C₆H₅) | " | " |
| 132 | " | —SO₂C₂H₅ | " | " |
| 133 | —Cl | " | " | " |
| 134 | —H | —Cl | " | " |
| 135 | —CH₃ | —CF₃ | " | " |
| 136 | —CH₃ | —SO₂NH₂ | (1-ethyl-2-methylindole) | reddish-tinged yellow |
| 137 | —H | " | " | " |
| 138 | —CH₃ | —SO₂NHCH₃ | " | " |
| 139 | —H | " | " | " |
| 140 | —CH₃ | —SO₂N(CH₃)₂ | " | " |
| 141 | " | —CONH₂ | " | " |
| 142 | " | —CON(CH₃)₂ | " | " |
| 143 | " | —Cl | " | " |
| 144 | " | —CF₃ | " | " |
| 145 | —Cl | —SO₂C₂H₅ | " | " |
| 146 | —CH₃ | —SO₂NH₂ | (2-phenylindole) | orange |
| 147 | —H | " | " | " |
| 148 | —CH₃ | —SO₂NHCH₃ | " | " |

TABLE 1-continued

| Example | Diazo component X | Diazo component R | Coupling component | Shade on polyamide |
|---|---|---|---|---|
| 149 | —H | " | | " |
| 150 | —CH₃ | —CONH₂ | (indole-type structure: pyridine fused with benzene via pyrrole NH) | orange |
| 151 | " | —CON(CH₃)₂ | " | " |
| 152 | —CH₃ | —SO₂NH₂ | (pyrazole coupler: CH₂–C(=NH)–N(Ph)–N=C(CH₃)–) | yellow |
| 153 | —H | " | " | " |
| 154 | —CH₃ | —SO₂NHCH₃ | " | " |
| 155 | —H | " | " | " |
| 156 | —CH₃ | —SO₂N(CH₃)₂ | " | " |
| 157 | —H | " | " | " |
| 158 | —CH₃ | —SO₂N(CH₃)–phenyl (H) | " | " |
| 159 | " | —SO₂C₂H₅ | " | " |
| 160 | —Cl | " | " | " |
| 161 | —H | —Cl | (pyrazole coupler: CH₂–C(=NH)–N(Ph)–N=C(CH₃)–) | yellow |
| 162 | —CH₃ | —CF₃ | " | " |
| 163 | " | —CONH₂ | " | greenish-tinged yellow |
| 164 | " | —CON(CH₃)₂ | " | " |
| 165 | " | —CONHC₂H₅ | " | " |
| 166 | " | —CONH₂ | (pyrazolone coupler: CH₂–C(=O)–N(4-CH₃-C₆H₄)–N=C(CH₃)–) | reddish-tinged yellow |
| 167 | " | —CON(CH₃)₂ | " | " |
| 168 | " | —SO₂N(CH₃)₂ | " | " |
| 169 | " | —CONH₂ | (pyrazolone coupler: CH₂–C(=O)–N(4-Cl-C₆H₄)–N=C(CH₃)–) | " |
| 170 | " | —CON(CH₃)₂ | " | " |
| 171 | " | —SO₂N(CH₃)₂ | " | " |

TABLE 1-continued

| Example | Diazo component X | R | Coupling component | Shade on polyamide |
|---|---|---|---|---|
| 172 | —CH₃ | —SO₂NH₂ | (pyrazolone with 2-Cl-4-methylphenyl) | reddish-tinged yellow |
| 173 | " | —SO₂N(CH₃)₂ | " | " |
| 174 | " | —CONH₂ | " | " |
| 175 | " | —CON(CH₃)₂ | " | " |
| 176 | " | —Cl | " | " |
| 177 | —CH₃ | —SO₂N(CH₃)₂ | phenyl-OCH₃* | yellowish-tinged orange |
| 178 | —H | " | " | " |
| 179 | —CH₃ | —CON(CH₃)₂ | " | " |
| 180 | " | —Cl | " | " |
| 181 | " | —SO₂CH₃ | " | " |
| 182 | " | —CF₃ | " | " |
| 183 | " | —SO₂N(CH₃)₂ | naphthyl-OCH₃* | orange |
| 184 | —CH₃ | CON(CH₃)₂ | naphthyl-OCH₃* | orange |
| 185 | " | —Cl | " | " |
| 186 | " | —SO₂NH₂ | 3-methyl-4-N(C₂H₄CN)₂-phenyl | " |
| 187 | " | —SO₂N(CH₃)₂ | " | " |
| 188 | " | —Cl | " | " |
| 189 | " | —CON(CH₃)₂ | " | " |
| 190 | " | —SO₂NH₂ | 3-chloro-4-N(CH₃)₂-phenyl | reddish-tinged orange |
| 191 | " | —CONH₂ | " | " |
| 192 | " | —Cl | " | " |

TABLE 1-continued

| Example | Diazo component X | Diazo component R | Coupling component | Shade on polyamide |
|---|---|---|---|---|
| 193 | " | —SO$_2$N(CH$_3$)—C$_6$H$_4$(H) | 1-hydroxy-6-amino-naphthalene with SO$_3$H | violet |
| 194 | —CH$_3$ | —SO$_2$N(CH$_3$)—C$_6$H$_4$(H) | pyrazolone coupler with Cl, SO$_3$H (CH$_2$-C(=NH), CH$_3$-C=N-N-aryl) | yellow |
| 195 | —H | " | " | " |
| 196 | —CH$_3$ | —CF$_3$ | " | " |
| 197 | " | —SO$_2$N(CH$_3$)—C$_6$H$_4$(H) | pyrazolone coupler with SO$_3$H | " |
| 198 | " | " | N(C$_2$H$_5$)(CH$_2$-C$_6$H$_4$-SO$_3$H), 3-CH$_3$-aniline | yellowish-tinged red |
| 199 | —CH$_3$ | —SO$_2$NH$_2$ | naphthalene with OH, SO$_3$H, NH-(2-Cl-C$_6$H$_4$), N=C-(CH$_2$)$_4$CH$_3$ | red |
| 200 | " | —SO$_2$N(CH$_3$)$_2$ | " | " |
| 201 | " | " | N(C$_2$H$_5$)(CH$_2$CH$_2$OH), 3-CH$_3$-aniline | " |
| 202 | " | " | N(C$_2$H$_5$)(CH$_2$CH$_2$Cl)-aniline | yellowish-tinged red |
| 203 | " | —SO$_2$NH$_2$ | 2-OCH$_3$, 5-NHCOCH$_3$, NHCH$_2$-C$_6$H$_5$ aniline | bluish-tinged red |

TABLE 1-continued

| Example | Diazo component X | Diazo component R | Coupling component | Shade on polyamide |
|---|---|---|---|---|
| 204 | —Cl | —CH₃ | [3-methyl-4-(N,N-diethylamino)phenyl] | yellowish-tinged red |
| 205 | —H | " | " | " |
| 206 | —Cl | —SO₂NH₂ | " | red |
| 207 | " | —SO₂NHCH₃ | " | " |
| 208 | " | —SO₂N(CH₃)₂ | " | " |
| 209 | " | —SO₂NHC₂H₅ | " | " |
| 210 | " | —SO₂N(C₂H₅)₂ | " | " |
| 211 | " | —SO₂NHC₄H₉ | " | " |
| 212 | " | —SO₂N(CH₃)(C₆H₅) | " | " |
| 213 | " | —SO₂NH(C₆H₅) | " | " |
| 214 | —H | " | " | " |
| 215 | " | " | [3-acetylamino-4-(N,N-diethylamino)phenyl] | " |
| 216 | —Cl | " | " | " |
| 217 | " | —SO₂NH₂ | " | " |
| 218 | " | —SO₂NHCH₃ | " | " |
| 219 | " | —Cl | " | — |
| 220 | —Cl | —CF₃ | [3-acetylamino-4-(N,N-diethylamino)phenyl] | red |
| 221 | —CH₃ | " | " | " |
| 222 | —H | " | " | " |
| 223 | " | —SO₂NH₂ | [4-(N,N-dibutylamino)phenyl] | " |
| 224 | —Cl | " | " | " |
| 225 | " | " | [3-methyl-4-(N,N-dibutylamino)phenyl] | " |
| 226 | " | —SO₂NHCH₃ | " | " |
| 227 | " | —CF₃ | " | " |

TABLE 1-continued

| Example | Diazo component X | R | Coupling component | Shade on polyamide |
|---|---|---|---|---|
| 228 | —CH₃ | —CO-C₆H₄-Cl | pyrazole coupling component with NH, CH₂–C, N–N=C(CH₃), N-phenyl | yellow |
| 229 | " | —SO₂NH₂ | 4-[N(C₂H₅)(CH₂CH₂OH)]-3-methylphenyl | red |
| 230 | —H | " | " | " |
| 231 | —Cl | " | " | " |
| 232 | " | —CF₃ | " | " |
| 233 | —H | —CF₃ | 4-[N(C₂H₅)(CH₂CH₂OH)]-3-methylphenyl | red |
| 234 | —CH₃ | " | " | " |
| 235 | —Cl | —Cl | " | " |
| 236 | " | —CH₃ | " | " |
| 237 | —CH₃ | —Cl | " | " |
| 238 | " | —SO₂NH₂ | 4-[N(C₃H₇)₂]-3-methylphenyl | " |
| 239 | —H | " | " | " |
| 240 | —Cl | " | " | " |
| 241 | " | —CF₃ | " | " |
| 242 | —H | " | " | " |
| 243 | —CH₃ | " | " | " |
| 244 | —Cl | —Cl | " | " |
| 245 | " | —CH₃ | " | " |
| 246 | —CH₃ | —Cl | " | " |
| 247 | " | " | 4-[N(C₂H₅)(C₃H₇)]-3-methylphenyl | " |
| 248 | —Cl | —CH₃ | 4-[N(C₂H₅)(C₃H₇)]-3-methylphenyl | red |
| 249 | " | —Cl | " | " |
| 250 | —CH₃ | —CF₃ | " | " |
| 251 | —H | " | " | " |
| 252 | —Cl | " | " | " |
| 253 | " | —SO₂NH₂ | " | " |
| 254 | —CH₃ | " | " | " |
| 255 | —H | " | " | " |

TABLE 1-continued

| Example | Diazo component X | R | Coupling component | Shade on polyamide |
|---|---|---|---|---|
| 256 | —Cl | —SO$_2$NH$_2$ | (2-methylindole) | reddish-tinged yellow |
| 257 | " | —CF$_3$ | " | " |
| 258 | —H | " | " | " |
| 259 | —Cl | —Cl | " | " |
| 260 | —CH$_3$ | —CH$_3$ | " | " |
| 261 | —Cl | " | " | " |
| 262 | " | —SO$_2$NH$_2$ | (1-phenyl-3-methyl-5-aminopyrazole) | yellow |
| 263 | —Cl | —CF$_3$ | (1-phenyl-3-methyl-5-aminopyrazole) | yellow |
| 264 | H | " | " | " |
| 265 | Cl | —Cl | " | " |
| 266 | —CH$_3$ | —CH$_3$ | " | " |
| 267 | —Cl | " | " | " |
| 268 | " | —CF$_3$ | (1-(2-chloro-6-methylphenyl)-3-methyl-5-pyrazolone) | reddish-tinged yellow |
| 269 | —H | " | " | " |
| 270 | —Cl | —Cl | " | " |
| 271 | —CH$_3$ | —CH$_3$ | " | " |
| 272 | —Cl | " | " | " |
| 273 | —CH$_3$ | —CF$_3$ | " | " |
| 274 | " | —SO$_2$NH$_2$ | (N-ethyl-1,2,3,4-tetrahydroquinoline) | red |
| 275 | —H | " | " | " |
| 276 | —Cl | " | " | " |
| 277 | " | —CF$_3$ | " | " |
| 278 | —H | —CF$_3$ | (N-ethyl-8-methyl-1,2,3,4-tetrahydroquinoline) | red |

TABLE 1-continued

| Example | Diazo component X | R | Coupling component | Shade on polyamide |
|---|---|---|---|---|
| 279 | —CH₃ | " | " | " |
| 280 | —Cl | —Cl | " | " |
| 281 | " | —CH₃ | " | " |
| 282 | —CH₃ | —Cl | " | " |
| 283 | " | —CH₃ | " | " |
| 284 | " | —SO₂NH₂ | (structure: N-methyl-1,2,3,4-tetrahydroquinoline) | " |

The procedure described in Examples 1 to 13 is repeated, except that a compound of the formula

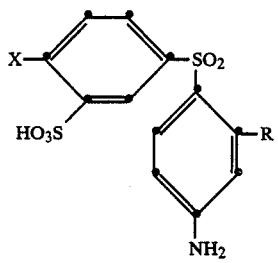

in which R and X are as defined in Table 2 which follows, is used as the diazo component and the compounds listed in Table 2 which follows are used as the coupling component, likewise affording useful dyes which have similarly good properties and dye polyamide and wool in the stated shade.

TABLE 2

| Example | Diazo component X | R | Coupling component | Shade on polyamide |
|---|---|---|---|---|
| 285 | —CH₃ | —CONH₂ | (3-methyl-N,N-diethylaniline) | yellowish-tinged red |
| 286 | " | —Cl | " | yellowish-tinged red |

The procedure described in Examples 1 to 13 is repeated, except that a compound of the formula

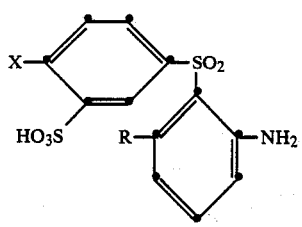

in which R and X are as defined in Table 3 which follows, is used as the diazo component and the compounds listed in Table 3 which follows are used as the coupling component, likewise affording useful dyes which have similarly good properties and dye polyamide and wool in the stated shade.

TABLE 3

| Example | Diazo component X | R | Coupling component | Shade on polyamide |
|---|---|---|---|---|
| 287 | —CH₃ | Cl | (3-methyl-N,N-diethylaniline) | yellowish-tinged red |
| 288 | —H | " | " | yellowish-tinged red |
| 289 | —CH₃ | " | (N,N-dibutylaniline) | yellowish-tinged red |
| 290 | " | " | (2-methylindole) | reddish-tinged yellow |
| 291 | —H | " | " | reddish-tinged yellow |
| 292 | —CH₃ | " | (1-phenyl-3-methyl-5-aminopyrazole) | yellow |
| 293 | —H | " | " | " |
| 294 | —CH₃ | " | (3-methyl-N,N-dibutylaniline) | yellowish-tinged red |
| 295 | —H | " | " | yellowish-tinged |

TABLE 3-continued

| Example | Diazo component X | R | Coupling component | Shade on polyamide |
|---------|-------------------|---|--------------------|--------------------|
|         |                   |   |                    | red                |

The procedure described in Examples 1 to 13 is repeated, except that a compound of the formula

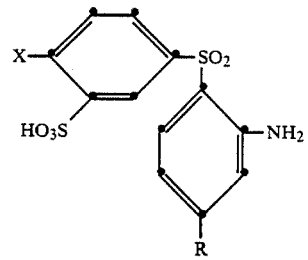

in which R and X are as defined in Table 4 which follows, is used as the diazo component and the compounds listed in Table 4 which follows are used as the coupling component, likewise affording useful dyes which have similarly good properties and dye polyamide and wool in the stated shade.

TABLE 4

| Example | Diazo component X | R | Coupling component | Shade on wool |
|---------|-------------------|---|--------------------|---------------|
| 296 | —CH$_3$ | —SO$_2$NH$_2$ | (8-OH, 1-NHCO-C$_6$H$_4$-NHCOCHBrCH$_2$Br, 3,6-di-SO$_3$H naphthalene) | red |
| 297 | —H | " | " | " |
| 298 | " | —SO$_2$N(CH$_3$)$_2$ | " | " |
| 299 | —CH$_3$ | —CONH$_2$ | " | " |
| 300 | " | —SO$_2$C$_2$H$_5$ | " | " |
| 301 | " | Cl | " | " |
| 302 | " | CF$_3$ | " | " |
| 303 | " | —SO$_2$N(CH$_3$)—C$_6$H$_4$—H | " | " |
| 304 | " | " | (8-OH, 1-NHCO-C$_6$H$_4$-NHCOCHBrCH$_2$Br, 3,6-di-SO$_3$H naphthalene) | " |
| 305 | " | —SO$_2$NH$_2$ | " | " |
| 306 | —CH$_3$ | —SO$_2$NH$_2$ | (8-OH, 6-SO$_3$H, 2-NHCOCHBrCH$_2$Br naphthalene) | yellowish-tinged red |
| 307 | —H | " | " | yellowish-tinged red |

TABLE 4-continued

| Example | Diazo component X | R | Coupling component | Shade on wool |
|---|---|---|---|---|
| 308 | —CH₃ | " | (naphthol structure: OH, SO₃H, N(CH₃)—CO—CHBrCH₂Br) | reddish-tinged orange |
| 309 | —H | " | " | " |
| 310 | —CH₃ | —SO₂NH₂ | (naphthol structure with NHCO-phenyl-NH-pyrimidine: OH, SO₃H, SO₃H, F, N, N, Cl, F) | red |
| 311 | —H | " | " | " |

The procedure described in Examples 1 to 13 is repeated, except that a compound of the formula

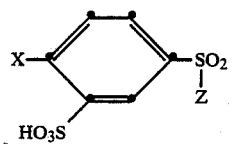

in which X and Z are as defined in Table 5 which follows, is used as the diazo component and the compounds listed in Table 5 which follows are used as the coupling component, likewise affording useful dyes which have similarly good properties and dye polyamide and wool in the stated shade.

TABLE 5

| Example | Diazo component X | Z | Coupling component | Shade on polyamide |
|---|---|---|---|---|
| 312 | —CH₃ | (phenyl-NH₂) | (indole with CH₃ and N—H) | reddish-tinged yellow |
| 313 | —H | " | " | " |
| 314 | —CH₃ | " | (indole with CH₃ and N—C₂H₅) | " |
| 315 | —H | " | " | " |
| 316 | —Cl | " | " | " |
| 317 | —CH₃ | " | (pyrazole structure: CH₂—C(=NH), C(CH₃)=N—N-phenyl) | yellow |

TABLE 5-continued

| Example | Diazo component X | Z | Coupling component | Shade on polyamide |
|---|---|---|---|---|
| 318 | —Cl | " | " | " |
| 319 | —H | " | " | " |
| 320 | —CH₃ | (aniline with NH₂) | (1-phenyl-3-methyl-5-pyrazolone) | reddish-tinged yellow |
| 321 | —Cl | " | " | " |
| 322 | —H | " | " | " |
| 323 | —CH₃ | " | (1-(4-methylphenyl)-3-methyl-5-pyrazolone) | " |
| 324 | —Cl | " | " | " |
| 325 | —H | " | " | " |
| 326 | —CH₃ | " | (1-(2-chloro-6-methylphenyl)-3-methyl-5-pyrazolone) | " |
| 327 | —Cl | " | " | " |
| 328 | —H | " | " | " |
| 329 | —CH₃ | (aniline with NH₂) | (1-(2-ethylphenyl)-3-methyl-5-pyrazolone) | reddish-tinged yellow |
| 330 | —Cl | " | " | " |
| 331 | —H | " | " | " |
| 332 | —CH₃ | " | (3-methyl-4-[N(C₂H₄CN)₂]-aniline) | yellowish-tinged orange |
| 333 | —H | " | " | " |
| 334 | —Cl | " | " | " |
| 335 | —CH₃ | " | (methoxynaphthalene —OCH₃*) | orange |
| 336 | —H | " | " | " |
| 337 | —Cl | " | " | " |

TABLE 5-continued

| Example | Diazo component X | Z | Coupling component | Shade on polyamide |
|---|---|---|---|---|
| 338 | —CH₃ | 2-aminophenyl (—NH₂ ortho) | 4-methoxy-3-methylphenyl (—OCH₃*, —CH₃) | orange |
| 339 | —Cl | " | " | " |
| 340 | —H | " | " | " |
| 341 | —CH₃ | " | 4-methoxyphenyl (—OCH₃*) | yellowish-tinged orange |
| 342 | —Cl | " | " | " |
| 343 | —H | " | " | " |
| 344 | —CH₃ | " | 4-(N,N-diethylamino)phenyl (—N(C₂H₅)₂) | reddish-tinged orange |
| 345 | —Cl | " | " | " |
| 346 | —H | " | " | " |
| 347 | —CH₃ | " | N-ethyl-N-benzyl-3-methylaniline (—N(C₂H₅)(CH₂—C₆H₅), —CH₃) | " |
| 348 | —Cl | " | " | " |
| 349 | —H | " | " | " |
| 350 | —CH₃ | 2-aminophenyl (—NH₂ ortho) | N-ethyl-N-benzylaniline (—N(C₂H₅)(CH₂—C₆H₅)) | orange |
| 351 | —Cl | " | " | " |
| 352 | —H | " | " | " |
| 353 | —CH₃ | " | 4-(N,N-diethylamino)-3-methylphenyl (—N(C₂H₅)₂, —CH₃) | yellowish-tinged red |
| 354 | —Cl | " | " | " |
| 355 | —H | " | " | " |
| 356 | —CH₃ | " | 4-(N,N-diethylamino)-3-acetamidophenyl (—N(C₂H₅)₂, —NHCOCH₃) | " |
| 357 | —Cl | " | " | " |
| 358 | —H | " | " | " |

TABLE 5-continued

| Example | Diazo component X | Diazo component Z | Coupling component | Shade on polyamide |
|---|---|---|---|---|
| 359 | —CH$_3$ | 4-aminophenyl | 2-methylindol-3-yl (NH) | reddish-tinged yellow |
| 360 | —H | 4-aminophenyl | 2-methylindol-3-yl (NH) | reddish-tinged yellow |
| 361 | —Cl | '' | '' | '' |
| 362 | —CH$_3$ | '' | 1-ethyl-2-methylindol-3-yl | '' |
| 363 | —H | '' | '' | '' |
| 364 | —Cl | '' | '' | '' |
| 365 | —CH$_3$ | 4-aminophenyl | 3-methyl-5-imino-1-phenyl-2-pyrazolin-4-yl | yellow |
| 366 | —Cl | '' | '' | '' |
| 367 | —H | '' | '' | '' |
| 368 | —CH$_3$ | 4-aminophenyl | 3-methyl-5-oxo-1-phenyl-2-pyrazolin-4-yl | reddish-tinged yellow |
| 269 | —Cl | '' | '' | '' |
| 370 | —H | '' | '' | '' |
| 371 | —CH$_3$ | '' | 3-methyl-5-oxo-1-(4-methylphenyl)-2-pyrazolin-4-yl | '' |
| 372 | —Cl | '' | '' | '' |
| 373 | —H | '' | '' | '' |

TABLE 5-continued

| Example | Diazo component X | Diazo component Z | Coupling component | Shade on polyamide |
|---|---|---|---|---|
| 374 | —CH₃ | " | (3-methyl-4-(N-(2-chloro-6-methylphenyl)hydrazono)pent-2-one structure with CH₂-C(=O)-N-N=C(CH₃)- attached to 2-Cl-6-CH₃-phenyl) | " |
| 375 | —Cl | " | " | " |
| 376 | —H | " | " | " |
| 377 | —CH₃ | 4-aminophenyl | (hydrazono-pyrazolone with 2-C₂H₅-phenyl) | reddish-tinged yellow |
| 378 | —Cl | " | " | " |
| 379 | —H | " | " | " |
| 380 | —CH₃ | " | 3-methyl-4-[N(C₂H₄CN)₂]-phenyl | yellowish-tinged orange |
| 381 | —Cl | " | " | " |
| 382 | —H | " | " | " |
| 383 | —CH₃ | " | naphthyl-OCH₃* | orange |
| 384 | —Cl | " | " | " |
| 385 | —H | " | " | " |
| 386 | —CH₃ | 4-aminophenyl | 3-methyl-4-OCH₃*-phenyl | orange |
| 387 | —Cl | " | " | " |
| 388 | —H | " | " | " |
| 389 | —CH₃ | " | phenyl-OCH₃* | yellowish-tinged orange |
| 390 | —Cl | " | " | " |
| 391 | —H | " | " | " |
| 392 | —CH₃ | " | phenyl-N(C₂H₅)₂ | reddish-tinged orange |

TABLE 5-continued
| Example | Diazo component X | Z | Coupling component | Shade on polyamide |
|---|---|---|---|---|
| 393 | —Cl | " | " | " |
| 394 | —H | " | " | " |
| 395 | —CH₃ | " | 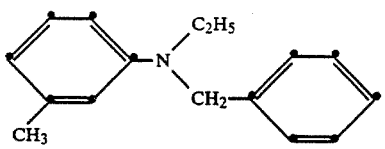 | " |
| 306 | —Cl | " | " | " |
| 397 | —H | " | " | " |
| 398 | —CH₃ | 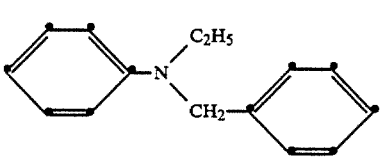 | 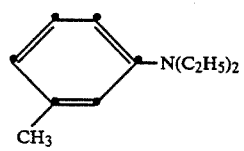 | orange |
| 399 | —Cl | " | " | " |
| 400 | —H | " | " | " |
| 401 | —CH₃ | " | 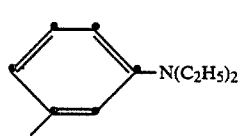 | yellowish-tinged red |
| 402 | —Cl | " | " | " |
| 403 | —H | " | " | " |
| 404 | —CH₃ | " | 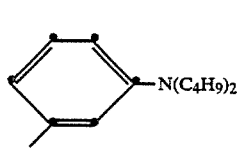 | " |
| 405 | —Cl | " | " | " |
| 406 | —H | " | " | " |
| 407 | —CH₃ | (see below) | (see below) | yellowish-tinged red |
| 408 | —Cl | " | " | " |
| 409 | —H | " | " | " |
| 410 | —CH₃ | (see below) | " | " |
| 411 | —Cl | " | " | " |
| 412 | —H | " | " | " |

TABLE 5-continued

| Example | Diazo component X | Diazo component Z | Coupling component | Shade on polyamide |
|---|---|---|---|---|
| 413 | —CH₃ | " | 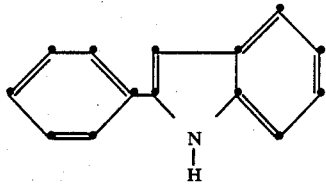 | yellowish-tinged orange |
| 414 | —Cl | " | " | " |
| 415 | —H | " | " | " |
| 416 | —CH₃ | 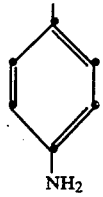 | 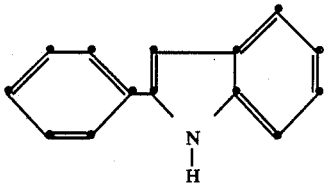 | yellow |
| 417 | —Cl | " | " | " |
| 418 | —H | " | " | " |
| 419 | " | " | 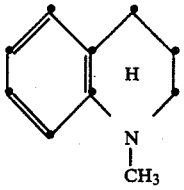 | yellowish-tinged red |
| 420 | —Cl | " | " | " |
| 421 | —CH₃ | " | " | " |
| 422 | " | " | 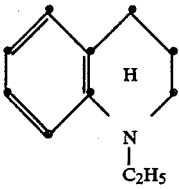 | " |
| 423 | —Cl | " | " | " |
| 424 | —H | " | " | " |
| 425 | " | " | 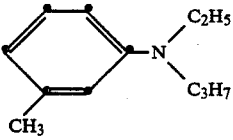 | " |
| 426 | —Cl | " | " | " |
| 427 | —CH₃ | " | " | " |

Dyeing instruction I 10 parts of Helanca jersey are dyed in 500 parts of an aqueous liquor which contains 2 g/liter of ammonium acetate and has been brought to pH 5 with acetic acid. The amount of dye according to Example 12 is 1%, based on the fibre weight. The dyeing time is 30 to 90 minutes at a temperature of 98°. The dyed piece of Helanca is then taken out of the liquor and washed and dried in the conventional manner. A piece of Helanca which is dyed reddish-tinged yellow and has a clear shade and good overall fastness properties is obtained.

Dyeing instruction II 10 parts of Helanca jersey are dyed in 500 parts of an aqueous liquor which contains 1 g/liter of monosodium phosphate and has been brought to pH 6 with disodium phosphate. The amount of dye according to Example 11 is 2%, based on the fibre weight. The dyeing time is 30 to 90 minutes at a temperature of 98°. The dyed piece of Helanca is then taken out of the liquor and washed and dried in the conventional manner.

A piece of Helanca which is dyed red and has a clear shade and good overall fastness properties is obtained.

Dyeing instruction III 10 parts of a piece of wool are dyed, at a temperature of 98° for 30 to 90 minutes, in 500 parts of an aqueous liquor containing 4% by weight of ammonium sulfate, 1.5% by weight of 80% acetic acid, 1% by weight of the dye according to Example 13, based on the fibre weight. The liquor is then cooled to 80° and neutralised by addition of 2.5% by weight of 25% aqueous ammonia, and the goods are finished at this temperature for 15 minutes. The dyed piece of wool is then taken out of the liquor and washed and dried in the conventional manner. A piece of wool which has a clear shade and good overall fastness properties is obtained.

What is claimed is:

1. A monoazo dye of the formula

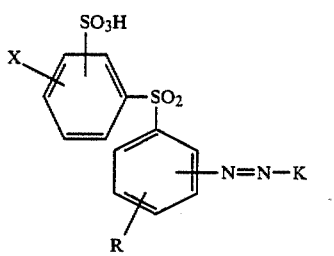

in which K is an amino- or alkoxy-benzene, alkoxynaphthalene, naphthol, aminonaphthol, pyrazolone, aminopyrazole, indole, naphthimidazole, diphenylamine, tetrahydroquinoline or acetoacetamide coupling component, R is hydrogen, halogen, $C_{1-6}$-alkyl, trifluoromethyl, carboxyl or —$SO_2C_{1-6}$-alkyl —$SO_2R_1$,

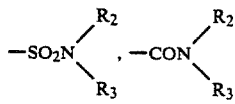

or —CO—$R_4$, in which $R_1$ is phenyl- or naphthyl-$C_{1-4}$-alkyl, unsubstituted or substituted in the phenyl or naphthyl moiety by $C_{1-4}$-alkyl, $C_{1-4}$-alkoxy, halogen $C_{1-6}$-alkanoylamino, hydroxy or carboxy, $R_2$ and $R_3$ independently of one another are hydrogen, $C_{1-6}$-alkyl, unsubstituted or substituted by halogen, hydroxy, cyano or $C_{1-4}$-alkoxy, or $C_{5-7}$-cycloalkyl, unsubstituted or substituted by halogen, $C_{1-4}$-alkyl, $C_{1-4}$-alkoxy, $R_4$ is phenyl, unsubstituted or substituted by $C_{1-4}$-alkyl, $C_{1-4}$-alkoxy or halogen, and wherein R may not be hydrogen or chlorine if —N=N—K is bonded to the phenyl ring in the o-position relative to the —$SO_2$— group and K is 2-amino-8-hydroxynaphthalene-6-sulfonic acid, and wherein R may not be hydrogen if —N=N—K is bonded to the phenyl ring in the o-position relative to the —$SO_2$— group and K is 1-(3',4'-dichlorophenyl)-3-methyl-5-aminopyrazole or an aminonaphtholsulfonic acid amide, and X is hydrogen, $C_{1-4}$-alkyl, $C_{1-4}$-alkoxy or halogen.

2. A monoazo dye according to claim 1 wherein the coupling component is selected from the group consisting of alkoxynaphthalene, naphthol, aminonaphthol, pyrazolone, aminopyrazole, naphthimidazole, tetrahydroquinoline and acetoacetamide radicals.

3. A monoazo dye according to claim 2 wherein X is bonded to the sulfophenyl ring in the p-position relative to the —$SO_2$— group.

4. A monoazo dye according to claim 3 wherein R is bonded to the phenyl ring in the o- or p-position relative to the —$SO_2$— group.

5. A monoazo dye according to claim 4 wherein the radical —N=N—K is bonded to the phenyl ring in the o- or p-position relative to the —$SO_2$— group.

6. A monoazo dye according to claim 5 wherein K is a hydroxynaphthalene radical which is unsubstituted or substituted by sulfo, an aminonaphthol radical which is unsubstituted or substituted in the naphthalene nucleus by sulfo and in which the amino group is unsubstituted or substituted by methyl, α,β-dibromopropionyl, α,β-dibromopropionylaminobenzoyl or 2,6-difluoro-5-chloropyrimidylaminobenzoyl, a 1-phenyl-3-methylpyrazolone radical which is unsubstituted or substituted in the phenyl radical by methyl, ethyl and chlorine, a 1-phenyl 3-methylaminopyrazole radical which is unsubstituted or substituted in the phenyl radical by chlorine or sulfo, an N-methyl- or N-ethyl-1,2,3,4-tetrahydroquinoline radical or a 1-chlorophenylamino-2-pentylnaphthimidazole radical which is substituted in the naphthalene nucleus by hydroxyl and sulfo, and R is hydrogen, chlorine, methyl, trifluoromethyl, carboxyl or an —$SO_2$—$C_{1-2}$—alkyl, —$SO_2$—benzyl, $$-SO_2N\begin{matrix}R_5\\R_6\end{matrix},\quad -CON\begin{matrix}R_5\\R_6\end{matrix}$$

or —CO—$R_7$ group, in which $R_5$ is hydrogen or $C_{1-3}$-alkyl, $R_6$ is hydrogen, $C_{1-6}$-alkyl which is unsubstituted or substituted by hydroxyl or methoxy, or cyclohexyl and $R_7$ is phenyl or chlorophenyl, and X is hydrogen, methyl, chlorine, or ethoxy.

7. A monoazo dye according to claim 6 wherein K is a 1-phenyl-3-methylaminopyrazole radical which is unsubstituted or substituted in the phenyl radical by chlorine or sulfo.

8. A monoazo dye according to claim 7 wherein the radicals R and —N=N—K are bonded to the phenyl ring in the o- or p-positions relative to the —$SO_2$— group.

9. A monoazo dye according to claim 7 wherein K is a 1-phenyl-3-methylaminopyrazole radical, X is hydrogen, chlorine or methyl, and R is hydrogen, chlorine, trifluoromethyl, ethylsulfonyl, p-chlorobenzoyl, sulfamoyl, N-methylsulfamoyl, N,N-dimethylsulfamoyl, N,N-diethylsulfamoyl or N-methyl-N-cyclohexylsulfamoyl.

10. A monoazo dye according to claim 1 wherein K is an amino- or alkoxy-benzene or an indole coupling component.

11. A monoazo dye according to claim 10 wherein X is bonded to the sulfophenyl group in the p-position relative to the —$SO_2$— group.

12. A monoazo dye according to claim 11 wherein the radical —N=N—K is bonded to the phenyl ring in the o-position relative to the —$SO_2$ group.

13. A monoazo dye according to claim 12 wheren K is an N-$C_{1-4}$-alkylamino- or N,N-di-$C_{1-4}$-alkylaminobenzene radical which is unsubstituted or substituted in the benzene ring by methyl, methoxy, chlorine and acetylamino and in which the N-alkyl radicals independently of one another are unsubstituted or substituted by hydroxyl, chlorine, cyano or phenyl, a methoxybenzene radical which is unsubstituted or substituted in the benzene ring by methyl, a 2-methyl- or 2-phenyl-indole radical which is unsubstituted or substituted in the 1-position by ethyl, and R is hydrogen, chlorine, methyl, trifluoromethyl, carboxyl or an —SO$_2$—C$_{1-2}$—alkyl, —SO$_2$—benzyl,

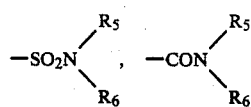

or —CO—R$_7$ group, in which R$_5$ is hydrogen or C$_{1-3}$-alkyl, R$_6$ is hydrogen, C$_{1-6}$-alkyl which is unsubstituted or substituted by hydroxyl or methoxy, or cyclohexyl and R$_7$ is phenyl or chlorophenyl, and X is hydrogen, methyl, chlorine or ethoxy.

14. A monoazo dye according to claim 13 wherein K is an N,N-di-C$_1$-C$_4$-alkylaminobenzene radical which is unsubstituted or substituted in the benzene nucleus by methyl, methoxy, chlorine or acetylamino and in the N-alkyl radicals independently of one another by hydroxyl, chlorine, cyano or phenyl, or K is a 2-methyl- or 2-phenyl-indole radical which is unsubstituted or substituted in the 1-position by ethyl.

15. A monoazo dye according to claim 14 of the formula

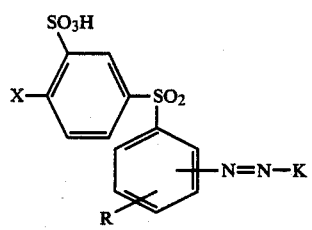

wherein the radicals N=N—K and R are bonded to the phenyl ring in the o- or p-position relative to the —SO$_2$— group.

16. A monoazo dye according to claim 15 wherein K is a 2-methyl- or 2-phenyl-indole radical, an N,N-diethyl-3-acetylaminoaniline radical, an N,N-diethyl- or N,N-dibutyl-3-methylaniline radical or an N-ethyl-N-phenethyl-3-methylaniline radical, X is hydrogen, chlorine or methyl and R is hydrogen, chlorine, trifluoromethyl, ethylsulfonyl, p-chlorobenzoyl, sulfamoyl, N-methylsulfamoyl, N,N-dimethylsulfamoyl, N,N-diethylsulfamoyl or N-methyl-N-cyclohexylsulfamoyl.

17. A monoazo dye according to claim 16 of the formula

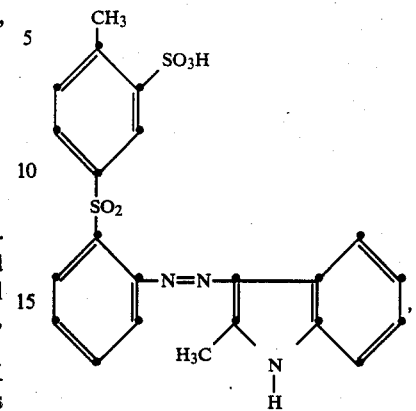

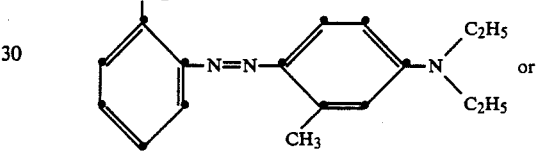

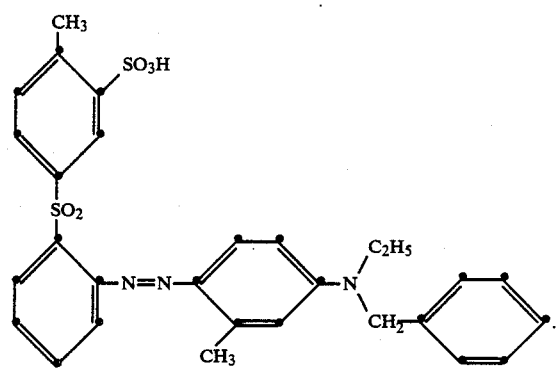

* * * * *